United States Patent [19]
Allen et al.

[11] Patent Number: 5,884,225
[45] Date of Patent: Mar. 16, 1999

[54] PREDICTING OPTIMUM HARVEST TIMES OF STANDING CROPS

[75] Inventors: Michael S. Allen, Okemos, Mich.; Richard W. Beverly, Sandwich, Ill.; James F. Beck, Marshall, Mich.

[73] Assignee: Cargill Incorporated, Wayzata, Minn.

[21] Appl. No.: 795,106

[22] Filed: Feb. 6, 1997

[51] Int. Cl.$^6$ .................................................. G06F 19/00
[52] U.S. Cl. ......................................................... 702/3
[58] Field of Search .............................. 702/3, 2; 705/7, 705/8

[56] References Cited

U.S. PATENT DOCUMENTS

5,566,069  10/1996  Clark, Jr. et al. .

FOREIGN PATENT DOCUMENTS

0 635 960 A1  1/1995  European Pat. Off. .
WO 95/24688  9/1995  WIPO .

OTHER PUBLICATIONS

Hintz, et al., "Predictionof Alfalfa Chemical Composition from Maturity and Plant Morphology," Crop Sci. 31:1561–1565 (1991).

Sanderson, "Predictors of Alfalfa Forage Quality: Validation with Field Data," Crop Sci., 32:245–250 (1992).

Fick, et al., "Statistical Models for Predicting Alfalfa Herbage Quality from Morphological or Weather Data," J. Prod. Agric., 1:160–166 (1988).

Sulc, "Equations for Predicting Quality of Alfalfa," Ohio State University, Tri–State Dairy Nutrition Conference, May 14 & 15, 1996, pp. 115–124.

Owens, et al., "A Rapid Method for Predicting Alfalfa Quality in the Field," J. Prod. Agric. 8:491–495 (1995).

Fick, et al., "Modeling Forage Quality Changes in the Growing Crop," pp. 757–795, in *Forage Quality, Evaluation, and Utilization* (ed., Fahey) 1994.

Reinke, et al., "Midwestern Climate Information System (MICIS) User Guide," SWS Misc. Pub. 157, pp. 1–2, Aug. 1994.

Cherney, "Spring Alfalfa Harvest in Relation to Growing Degree Days," 25th National Alfalfa Symposium, Feb. 27 & 28, 1995, pp. 29–36.

*Primary Examiner*—Donald E. McElheny, Jr.
*Attorney, Agent, or Firm*—Fish & Richardson, P.C., P.A.

[57] ABSTRACT

A system and a method for providing farmers/producers with crop characteristic predictions for standing crops located in fields includes a central database for storing field and crop information for the crops. A weather data processor receives raw weather data from either or both of (1) a weather data service with collected weather data from a plurality of weather stations; and (2) one or more site-specific weather stations associated with a particular field whose information is in the database. The raw weather data are processed to obtain field weather parameters for entry into a crop characteristic prediction equation, and the parameters are stored in the central database. With a user interface, a crop whose information is stored in the central database is selected. A computer calculates a crop characteristic prediction for the selected field based on the crop and field information stored in the central database, including the field weather parameters in the database, and the crop characteristic prediction formula. The producer uses the prediction to determine time of harvest. In one embodiment, the crops are alfalfa crops and the crop characteristic is neutral detergent fiber content.

53 Claims, 19 Drawing Sheets

Fig. 2

H.M.S. ALFALFA NDF PROJECTION SYSTEM
FIELD REGISTRATION FORM

TM _____  SEED ☐  FEED ☐  DATE _____

DISTRICT NUMBER _____ TERRITORY NUMBER _____  PHONE _____

COOPERATOR PROFILE

COOPERATOR NAME _____
SOCIAL SECURITY NUMBER _____

STREET ADDRESS _____

CITY, STATE, ZIP _____

COUNTY _____
PHONE NUMBER (INCLUDING AREA CODE)
   OFFICE _____
   HOME _____
   FAX _____
   MOBILE _____

CROPPING INFORMATION

ACRES OF ALFALFA _____
ACRES OF CORN
   SILAGE _____
ACRES OF HMC _____
ACRES OF EARLEGE _____
TOTAL CORN ACRES _____
ACRES OF SOYBEANS _____
ACRES OF WHEAT _____
SMALL GRAINS _____
OTHER _____
OTHER _____

HERD PROFILE

NUMBER OF MILKING COWS _____
ROLLING HERD AVG. _____
DHIA MEMBER  YES ___ NO ___
NUMBER OF PIGS FED/YR. _____
NUMBER OF BEEF STEERS FED/YR. _____

RATION PROFILE

TMR FEEDER                 YES   NO
PRESERVATIVES USED?  YES   NO
COTTON SEED USED?     YES   NO
CORN SILAGE AS % OF FORAGE __%
ALFALFA AS % OF FORAGE _____%

ALFALFA FIELD PROFILE

| FIELD NUMBER | 1 | | 2 | | 3 | | 4 | | 5 | |
|---|---|---|---|---|---|---|---|---|---|---|
| FIELD ID/NAME | | | | | | | | | | |
| VARIETY ID | | | | | | | | | | |
| SEEDING DATE | | | | | | | | | | |
| SOIL TYPE | | | | | | | | | | |
| IRRIGATION | YES | NO | YES | NO | YES | NO | YES | NO | YES | NO |
| CLEAR SEEDING | YES | NO | YES | NO | YES | NO | YES | NO | YES | NO |
| TYPE OF NURSE CROP | | | | | | | | | | |
| GRASS MIX | | | | | | | | | | |
| PLANTS/SQ. FT. | | | | | | | | | | |
| FIELD ZIP CODE | | | | | | | | | | |

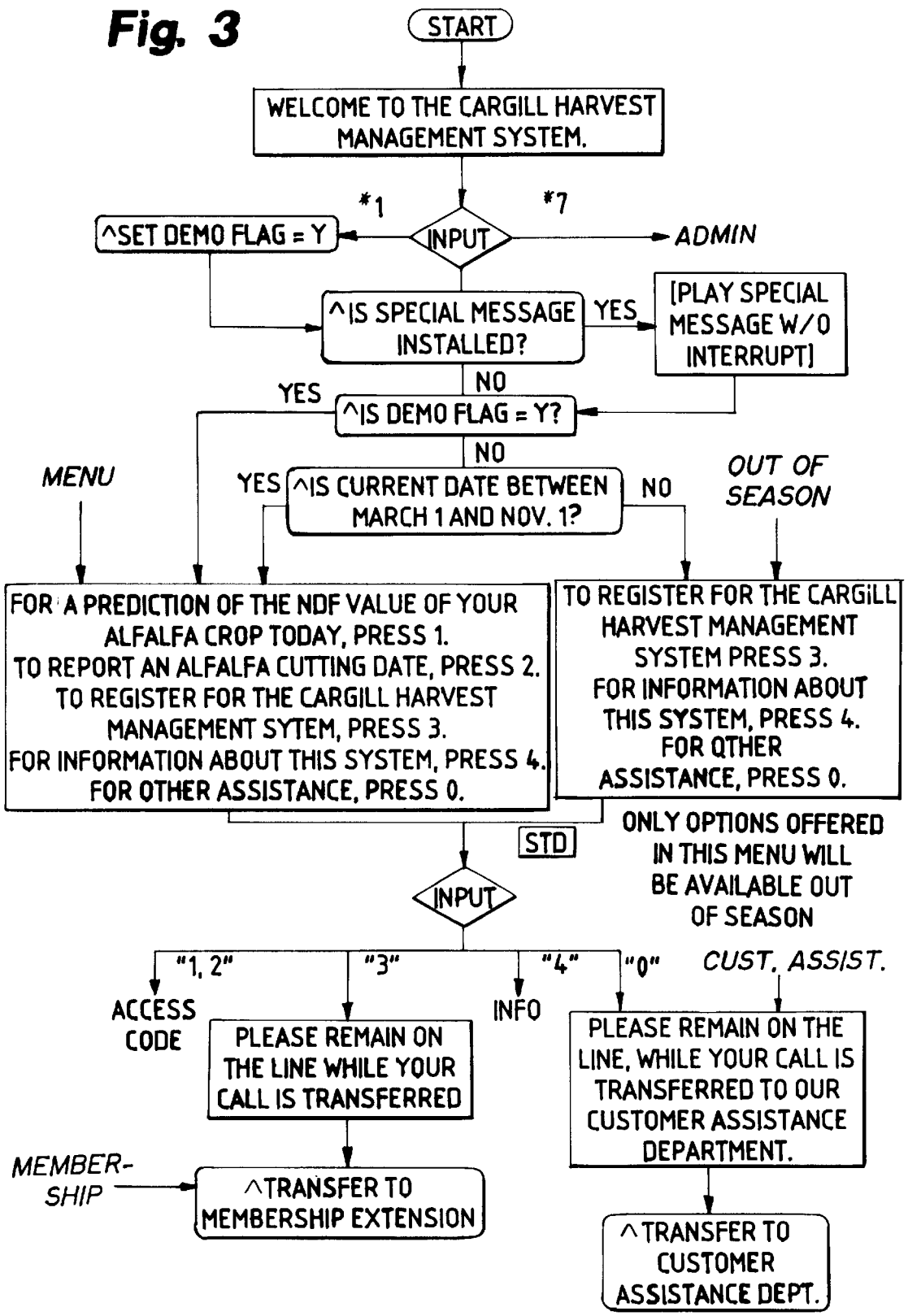

MULTIPLE ALFALFA FIELDS CAN BE HANDLED WITHIN THE SYSTEM ONCE A FIELD REGISTRATION PROCESS IS COMPLETED. IN ORDER TO PUT THIS SYSTEM TO WORK FOR YOUR ALFALFA CROP, YOU MUST REGISTER YOUR FIELDS WITH A CARGILL REPRESENTATIVE. AT THE TIME OF THE REGISTRATION YOU WILL RECEIVE AN ACCESS CODE AND A PERSONAL IDENTIFICATION NUMBER, A PERSONALIZED ALFALFA FIELD WORKBOOK WILL ALSO BE SUPPLIED FOR RECORDING FIELD PREDICTION DATA. THIS WORKBOOK WILL ALSO INCLUDE ADDITIONAL INFORMATION ABOUT THE CARGILL HARVEST MANAGEMENT SYSTEM. TO REGISTER, CONTACT YOUR CARGILL HYBRID SEEDS AGENT OR PRESS 3 ON YOUR TELEPHONE KEYPAD NOW.

Fig. 4b

MENU
OR
OUT OF
SEASON

Fig. 4

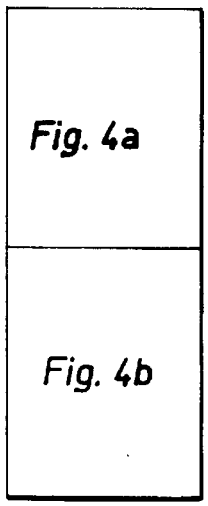

INFO

Fig. 4a

THE CARGILL HARVEST MANAGEMENT SYSTEM IS DESIGNED TO AID IN THE HARVEST MANAGEMENT OF ALFALFA PRODUCTION. THROUGH THE USE OF INTERACTIVE VOICE RESPONSE HARDWARE AND SOPHISTICATED COMPUTER SOFTWARE, YOU WILL BE ABLE TO OBTAIN VALUABLE HARVEST INFORMATION ABOUT YOUR ALFALFA FIELDS.

THIS TOOL MANAGES MANY INPUTS IN PROVIDING YOU INFORMATION ABOUT YOUR ALFALFA FIELDS. TO BEGIN, CLIMANTOLOGY DATA COMES FROM THE NATIONAL WEATHER SERVICE. THIS CLIMATE DATA IS THEN COMBINED WITH FIELD AGRONOMICS AND PLANT GROWTH FEATURES. NEXT, THE SYSTEM USES ALL OF THIS DATA TO IDENTIFY THE DAILY FIBER CONTENT OF A GROWING ALFALFA CROP. THE GOAL OF THIS SYSTEM IS TO ALLOW YOU TO HARVEST ALFALFA AT A DESIRED QUALITY PROFILE, OR TO HIT THE OPTIMUM HARVEST WINDOW.

RATHER THAN USING A FORAGE QUALITY TEST AFTER HARVEST, THIS SYSTEM PREDICTS THE NEUTRAL DETERGENT FIBER, OR NDF VALUE OF THE ALFALFA FIELD BEFORE IT IS HARVESTED. THE RESULT IS A DYNAMIC DECISION AID THAT WILL REVOLUTIONIZE HOW YOU APPROACH HARVEST SCHEDULING THROUGHOUT THE GROWING SEASON.

THE CARGILL HARVEST MANAGEMENT SYSTEM WILL PROVIDE YOU WITH A DAILY PREDICTION OF THE NDF VALUE FOR YOUR STANDING FIELD OF ALFALFA. NDF VALUES WILL BE ACCOMPANIED BY A STATISTICAL CONFIDENCE FACTOR TO REFLECT THE RANGE AND ACCURACY OF THE PREDICTION. THE SYSTEM WILL PREDICT A DAILY NDF VALUE FOR THE FIRST, SECOND, THIRD, AND FOURTH CUTTINGS THAT ARE HARVESTED BETWEEN THE MONTHS OF APRIL THROUGH OCTOBER. IN ORDER FOR THE SYSTEM TO PROVIDE THESE DAILY VALUES, YOU MUST ENTER INTO THE SYSTEM UPDATED CUTTING PROFILES FOR YOUR FIELDS THROUGHOUT THE GROWING SEASON.

PREDICTING OPTIMUM HARVEST TIMES OF STANDING CROPS

FIELD OF THE INVENTION

The invention relates to predicting optimum harvest times of standing crops and a system for determining the optimum harvest time that is easily accessible to producer/farmers.

BACKGROUND OF THE INVENTION

Alfalfa is an example of a crop for which an alfalfa producer attempts to optimize crop quality by harvesting it at an optimum time. Chemical and nutritional characteristics of alfalfa are not constant over its growing life. As an alfalfa crop matures, fiber content increases while protein content and digestibility decrease. The optimum chemical composition of an alfalfa forage is dependent on its intended use. In the case of alfalfa forage for high-producing dairy cattle, it has been determined that an optimum alfalfa forage has a neutral detergent fiber (NDF) content of 40 percent of dry matter (DM). Although crude protein (CP) content, digestibility and yield are important characteristics of an alfalfa forage crop, NDF content is generally the main characteristic upon which a harvest time decision is based. This is so because the NDF content is most directly determinative of the amount of feed supplements that will be required, and also because at present CP and digestibility have been found to be more difficult to predict accurately.

Harvesting alfalfa at the wrong time is costly to the producer. When alfalfa is the only forage fed, each unit of alfalfa forage NDF content over 40% DM has been estimated to amount to an increased cost for the dairy cattle operation of $33 per cow, per year. The increased cost arises, in part, because more grain is needed in the diet to give the animals sufficient energy and protein, and to reduce the filling effect of NDF in the diet. Also, the reduced digestibility of the NDF as the alfalfa matures increases the filling effect of the forage, reducing DM and energy intake, which decreases milk production. Alfalfa forage with an NDF content below 40% DM is undesirable also. First, the immature alfalfa forage crop has a lower yield. Also, the cows will need to eat more of the immature alfalfa to obtain the needed fiber, reducing the proportion of grain in the diet. Because grain has a higher energy content than alfalfa, this will reduce the energy content of the diet and will thus reduce milk production. Even further, the cows will get excess protein when fed the immature, high-protein alfalfa forage. Excess protein is undesirable because it is wasteful, may lead to additional environmental contamination, costs the animal additional energy to metabolize and excrete, and may reduce reproductive performance.

Determining the right harvest time has proven to be difficult. First, visual examination of a standing alfalfa crop has proven to be an inaccurate method. Second, a "scissors-cut" method involving lab testing of the cut samples is not a viable option for several reasons. The major problem is that fresh-cut forage is unstable due to respiratory enzymes; as sugars respire NDF content increases significantly. There is not enough time prior to the time that the alfalfa crop needs to be harvested to make this an accurate prediction method. From one day to the next, NDF content will increase on the order of 0.4% to 0.8% DM, so the window of harvesting is very short. Further, lab testing—even testing with the recent technology of near-infrared spectroscopy (NIRS)—requires work on the part of the producer to cut and prepare samples for testing. The testing also requires transportation time and costs in sending the samples to a laboratory.

Prediction modeling has become widely recognized as a desirable way of predicting, prior to harvest, various crop characteristics of an alfalfa crop. Various morphological and climatological variables and their relationship to various alfalfa crop characteristics have been studied. Using regression analyses, crop characteristic prediction equations have been developed and are continuously evolving as more empirical data upon which to base the equations are collected.

For example, in the 1980s Fick and Onstad developed a series of equations for various alfalfa crop characteristics including NDF content. Fick & Onstad, "Statistical Models for Predicting Alfalfa Herbage Quality from Morphological or Weather Data," J. Prod. Agric., Vol. 1, No. 2, 1988 ("Fick & Onstad, 1988"). The equations were based on a sample set including both first and subsequent cuttings in the same year. The equations were based on a single one of the following morphological and climatological variables: age of the herbage in days; growing degree days (GDDs) with a 41° F. (5° C.) base temperature and accumulated from the start of growth or regrowth; mean morphological stage by weight (MSW); leaf proportion of the herbage (LP); latitude of the collection site; and hours of light received during growth, again accumulated from the start of growth or regrowth. Fick and Onstad developed the following equation for total NDF content of alfalfa based on their data set:

$$NDF\ (total\ plant) = 20.5 + 0.0335\ (GDD)$$

(Id., Table 6.) Although Fick and Onstad studied the relationship between $GDD^2$ and total NDF content, $GDD^2$ was not found to be significant, and hence the relationship between total NDF content and GDD was found to be linear for the data set used in the study. In addition, Fick and Onstad found that the equations they developed based on morphological properties were better predictors, compared to the equations they developed based on climatological variables.

Sanderson later studied the Fick and Onstad single-variable equations and found that the equations were most valid for the region in which they were developed, and that calibration for specific geographic regions and frequent recalibration were necessary. Sanderson, "Crop Quality & Utilization," Crop Sci. 32:245–250, 1992. Also, a recent study by Cherney similarly concluded that it would be very difficult to produce a simple and fast method for predicting NDF that will hold up under a range of environments, and that prediction equations must be developed locally to offer any hope for reasonably accurate predictions. Cherney, "Spring Alfalfa Harvest in Relation to Growing Degree Days," Proceedings for the 25th National Alfalfa Symposium held Feb. 27–28, 1995.

Fick and Onstad also used step-wise multiple regression analysis to develop crop characteristic equations based on more than single factors. Fick & Onstad, 1988. They found that the best fitting equations included only two independent variables, one of which was always LP. For NDF, the equation was:

$$NDF = 39.6 + 11.5\ ln\ (MSW+1.0) - 33.0\ LP$$

(Id., Table 7.) For this equation, Fick and Onstad found the $r^2$ value to be equal to 0.83 and the root mean square error (RMSE) to be 2.79. The $r^2$ measure is the fraction of total variation explained by the equation. In other words, with $r^2$ equal to 0.83, the equation explains 83% of all variation. The RMSE measure is a measure of deviation in the prediction equation. Sixty-eight percent of all observations fall with the range of plus-or-minus one RMSE, which in this case is ±2.79% DM, and 90% fall within the range of plus-or-minus two RMSEs. Thus, equations with a higher $r^2$ measure and a lower RMSE measure are better fits for the data set. Finding values for both MSW and LP are laborious processes requiring special equipment. In particular, the processes involve sorting samples, drying the samples using an oven, and weighing the samples with a scale. As such, an equation utilizing variables of MSW and LP are not practicable for use by the producer.

Building on the study by Fick and Onstad, another study focusing on morphological factors as predictors of an alfalfa forage characteristics was done by Hintz and Albrecht. Hintz and Albrecht developed equations based on multiple variables using step-wise multiple regression. The prediction method using the equations of Hintz and Albrecht has been referred to as the "predictive equations for alfalfa quality" (PEAQ) method. The PEAQ equation for NDF is as follows:

$$NDF=16.89+0.27 \ (MAXHT)+0.81 \ (MAX)$$

where MAXHT is equal to the height of the tallest stem present in each sample in cm, and MAX is equal to the morphological stage of development of the most mature stem present in each sample. See Hintz and Albrecht, "Prediction of Alfalfa Chemical Composition from Maturity and Plant Morphology," Crop Sci. 31:1561–1565 (1991); and also Owens, Albrecht & Hintz, "A Rapid Method for Predicting Alfalfa Quality in the Field," J. Prod. Agric. 8:491–495 (1995). (The latter reference provides in its Table 1 the values for the variable "MAX" used for various morphological stages.)

Various individuals, including extension agents, have begun to make use of the various alfalfa crop characteristic prediction equations by collecting crop and/or field information needed for the equation, and then plugging that information into an equation to come up with a prediction. This has been done using a hand-held calculator or a personal computer that has the prediction equation programmed in to it.

Prediction models may create additional work for the producer that the producer may not have time to perform at the busy time of harvesting. Equations based on morphological factors, for example, require field sampling that the producer would not otherwise perform. Also, with equations based on climatological variables, the producer needs to obtain the climatological data. This may be easy for some prediction models using standard climatological variables. For other prediction models, however, the climatological data in the form required for entry into the prediction equation may not be readily available to the producer. In addition, the continued evolution of prediction equations will likely lead to the development of prediction models that are more accurate predictors but which are based upon climatological variables not available from any source and which may only be derived after complicated calculations of available climatological data.

SUMMARY OF THE INVENTION

Generally, the invention is a system and a method for providing farmers/producers with crop characteristic predictions for standing crops. In one aspect, the system has a central database for storing field and crop information for the crops. With a user interface, a crop whose information is stored in the central database may be selected. A computer calculates a crop characteristic prediction for a selected field based on the crop and field information stored in the central database and a crop characteristic prediction formula.

In one embodiment, the invention applies to alfalfa crops and provides a prediction as to neutral detergent fiber (NDF) content. In this embodiment, the system is a networked computer system. Crop and field information for various fields are stored in a central database server. Weather data are downloaded via the Internet from a weather service and are processed to estimate the weather conditions for each of the fields whose information is stored in the database. The processed, field-specific weather information, which will later be entered in a crop characteristic prediction equation, is stored in the central database server as further crop and field information. The networked computer system is connected to a voice information system, enabling producers to interact with the system and obtain predictions. A producer desiring a crop characteristic prediction, telephones the voice information system and using Touch Tone entries selects a field. That crop and field information (including the weather information) for the selected field is retrieved from the central database server. A prediction is calculated based on the retrieved information and a crop characteristic prediction equation. The equation includes as variables, among others, growing degree day information and a parameter reflective of at least growing period soil moisture, for example, plant height. The prediction is forwarded by the voice information system to the producer.

In other embodiments the crop may be corn silage (with perhaps the crop characteristic being plant moisture content); various grasses; sorghums; grains such as corn, wheat, rye and barley; and soybeans. Also, predictions of multiple crop characteristics for a single crop may be provided. With alfalfa as an example, the invention may be used to provide producers with a profile of predictions for NDF content, crude protein (CP) content, digestibility and yield. Further yet, different prediction equations can be used depending on input from the producer. For example, where the producer does not wish to measure various morphological parameters of the crop, the producer may obtain a prediction based on an equation that does not require those parameters. In this case, the prediction may not be as accurate as a prediction using an equation with the additional parameter; however, it is the producer who makes that trade-off.

Another aspect of the invention is its weather data processing. A weather data processor receives raw weather data from either or both of (1) a weather data service with collected weather data from a plurality of weather stations; and (2) one or more site-specific weather stations associated with a particular field whose information is in the database. The raw weather data are processed to obtain weather parameters for entry into the particular prediction equation being utilized.

Among the advantages of the invention are one or more of the following. Producers have ready access to the latest and most accurate crop prediction equations and to the parameters (e.g., weather parameters) used in the equation with as little additional work on the part of the producer as is possible. With this tool, producers are able to produce crops that are higher and more consistent in quality. Users and purchasers of the crop are also benefitted by the higher and more consistent quality crops. In addition, the invention is beneficial to researchers who will use the stored data to develop and refine further crop characteristic prediction equations.

BRIEF DESCRIPTION OF THE DRAWINGS

FIG. 2 is a registration form that may be used in connection with the system of FIG. 1.

FIGS. 3–18 are flow charts showing the operation of the voice information system of FIG. 1.

DETAILED DESCRIPTION OF THE PREFERRED EMBODIMENTS

Figure 1:
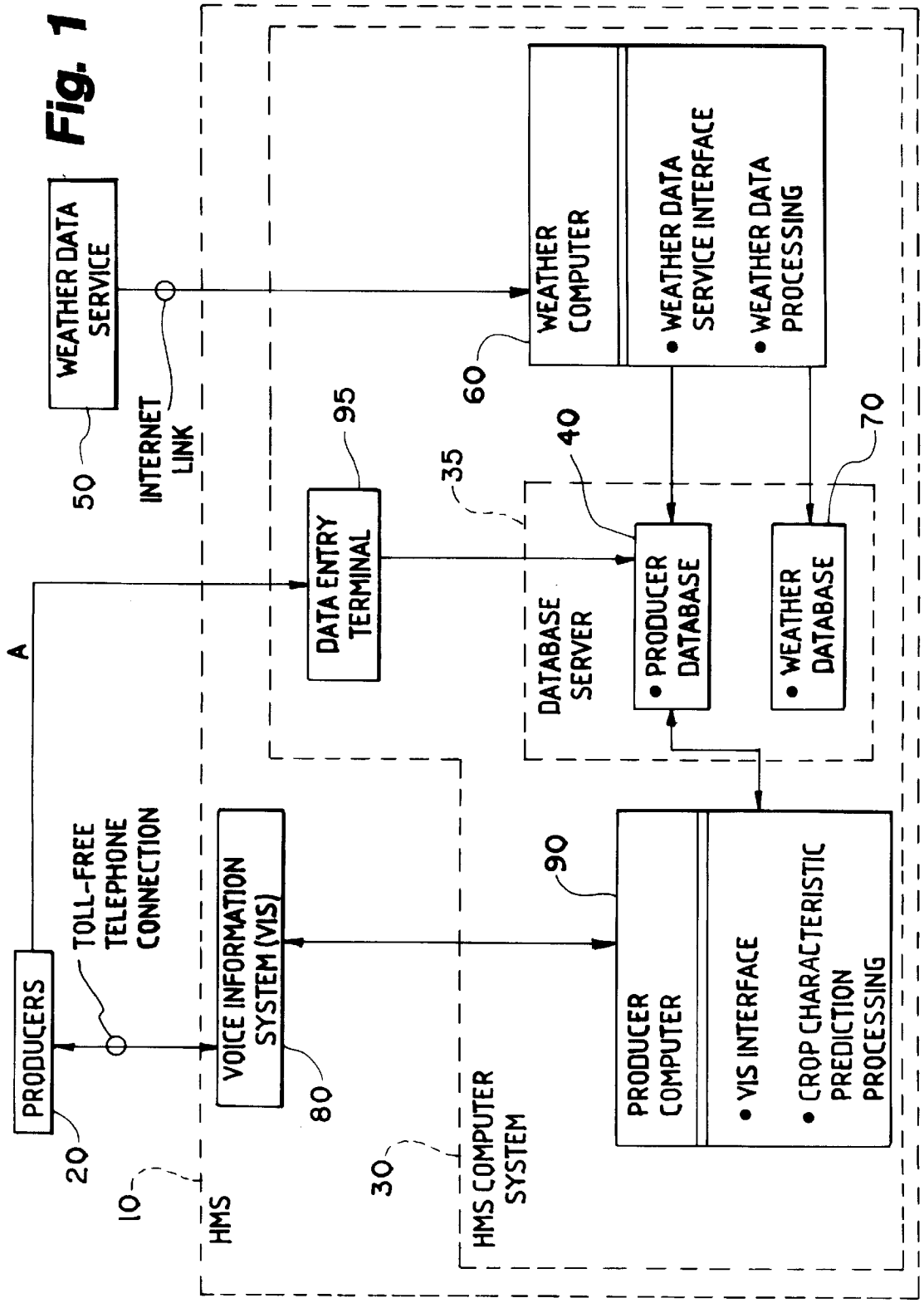
FIG. 1 is a block diagram of a system for providing producers with crop characteristic predictions in accordance with an aspect of the invention.

FIG. 1 shows a harvest management system (HMS) 10 in accordance with the invention. The HMS 10 provides, to a plurality of registered producers 20, a neutral detergent fiber (NDF) content predictions for standing alfalfa crops. The producers 20 use the crop characteristic prediction to determine when to harvest, and thus are able to optimize the NDF content of the alfalfa crop. The typical producer 20 who would use the HMS 10 is an alfalfa producer raising alfalfa to supply to a high-production dairy cattle operation. In many cases, the alfalfa producer 20 also runs the dairy cattle operation.

Although the invention will be described herein in an application of alfalfa where the crop characteristic being predicted is NDF content and only a single NDF prediction equation is employed, it will be understood that the invention has broader applicability. The invention may be used to provide crop characteristic predictions for any forage or non-forage crop whose harvest time must be optimized. Some examples include corn silage (preferably with plant moisture content being predicted); clovers; birdsfoot trefoil; various grasses; sorghums; grains such as corn, wheat, rye and barley; soybeans; and various fruits. In addition, with alfalfa crops where grasses are present (and in which the grasses might increase as a percentage of the total crop every year), a prediction could be developed based on a combination of a prediction for the alfalfa and a prediction for the grasses. The combined prediction could be made available to the producer 20 via the HMS 10.

The invention may also be utilized to provide predictions of multiple characteristics for a single crop. With alfalfa as an example, the invention may be used to provide producers with predictions for NDF content, crude protein (CP) content, digestibility and yield. Also, multiple equations could be used in connection with the invention, each utilizing different input parameters. In this case, where a value for a parameter is not available (perhaps because the producer 20 does not have time take of measurement of, for example, plant height), an equation where that parameter is not needed could be used to calculate a prediction. Thus, additional flexibility is offered to the producer 20.

Referring again to the disclosed embodiment and FIG. 1, producers 20 first have their alfalfa fields registered into the HMS 10. Field, crop and other information from the producer 20 is conveyed to a customer representative, as indicated by arrow A. The information is then manually input, using data entry terminal 95, into a producer database 40. The database 40 resides in an HMS computer system 30, and more particularly, in a database server 35 within the HMS computer system 30. The HMS 10 makes use of available and centrally collected weather data. At periodic intervals (once a day, for example), weather data from a weather data service 50 are downloaded, via the Internet, to a weather computer 60 which is a part of the HMS computer system 30. The weather computer 60 stores the downloaded weather data in a weather database 70. The downloaded weather data are also processed by the weather computer 60 to obtain an estimate of the weather for each of the registered alfalfa fields in a form for entry into a crop characteristic prediction equation. The processed, field-specific weather data in the desired form are then stored in the producer database 40.

When a producer 20 desires to obtain a current prediction of the NDF content of a standing alfalfa forage crop in a registered field, the producer 20 makes a toll-free telephone call to the HMS 10. The call is answered by a voice information system (VIS) 80. The VIS 80 provides pre-recorded voice messages and instructions to the caller/producer 20, who responds and interacts by making telephone keypad entries. After the producer 20 has entered a user ID and personal identification number (PIN), and has entered that he desires an NDF content prediction and selects the field for which he would like a prediction, the VIS 80 sends a message of that request to a producer computer 90. The producer computer 90 retrieves, from the producer database 40, field and crop information (including the field-specific weather data) for the selected field. The producer computer 90 then calculates an NDF prediction based on the retrieved data and the quality prediction equation. The prediction is forwarded to the VIS 80, whereupon the producer 20 is informed of the prediction by a voice message. The prediction is also stored in the producer database 40.

In addition to obtaining an NDF content prediction, the producer 20 uses the toll-free telephone access to the HMS 10 to perform other tasks. For example, the producer 20 telephones the HMS 10 to report the date on which a forage crop in a registered field was cut. That cut date information is stored in the producer database 40. Cut date information is needed so that the HMS 10 can provide a quality prediction for subsequent cuttings of the alfalfa crop. In addition, the VIS 80, when it receives a call from a producer 20 wanting to register a field, transfers the call to a customer representative who obtains registration information over the telephone and enters it manually into the producer database 40 using data entry terminal 95. In other embodiments, the producer 20 may also be able to enter lab-tested NDF content measures into the producer database 90 after the crop is harvested.

Using the HMS 10, a crop characteristic prediction based on an equation believed to be the most accurate is immediately and easily available to the producer 20. This enables the producer 20 to produce a crop that is higher and more consistent in quality.

In addition, crops harvested using the HMS 10 make possible end products that are higher and more consistent in quality. For example, HMS-produced alfalfa forage used in a high-producing dairy cattle operation will increase milk production while decreasing the amount of feed supplements, which decreases net cost. Alfalfa is also processed to produce pharmaceutical products. Various grains are processed to produce food ingredients, which in turn are used in a wide variety of products such as bread, tortilla chips, etc. Grains are also processed to yield hulls that are used for animal feed. Soy beans are processed to produce oils and meal for both human and animal consumption. Corn is processed to produce oils, high-fructose corn syrup sweeteners, and meal for both human and animal consumption. These are just of few of the many examples of processed end products whose quality would be made higher and more consistent with the use of the invention; these examples are not intended to limit the scope of the invention in any way.

Further yet, the HMS 10 is a beneficial tool for researchers developing more accurate prediction equations. The data stored in the HMS 10 are an excellent data source from which crop characteristic prediction equations can be developed and refined.

HMS Hardware and Software

The HMS computer system 30, in the embodiment disclosed herein, includes a conventional networked computer system with conventional system software. The database server 35 is a dedicated, pentium®-processor-based personal computer running Novell® database server software. The server 35 may be backed up by an identical server (not shown in FIG. 1) in case of server failure. Any conventional database software can be used to create the producer and weather databases 40 and 70, for example, Microsoft® FoxPro™ database software.

The producer computer 90 consists of at least one dedicated pentium®-based Microsoft® Windows™ 95 or NT 4.0 computer. To handle the number of calls expected from 1000 registered producers 20, two identical computers are used. In this case, each computer acts as a data server to the VIS 80, and the VIS 80 will consist of two VIS units, each corresponding to a different computer of the producer computer 90 or cross-tied to the same computer for resource-sharing. A specialized software program called "Socklink", written to 32-bit Windows™, runs on each of the two computers of the producer computer 90. This program provides a link to the VIS 80. This program also provides requested field and crop information stored in the producer database 90 and crop characteristic predictions to the VIS 80 for forwarding to the producer 20, and stores crop and field information input by the producer 20 into the producer database 40. This program also contains the NDF content prediction equation and executes the processing of the equation. This program is discussed in more detail below.

The weather computer 60 is a single dedicated pentium®-based Microsoft® Windows™ NT 4.0 computer. Running on this computer is a second specialized software program called "FetchMCC", also written to 32-bit Windows™. This program causes the weather data to be periodically downloaded and stored in the weather database 70, and updates various field-specific weather database files in the producer database 40. In the present application where weather data are downloaded over the Internet, the HMS computer system 30 must have access to the Internet. This "FetchMCC" program is also discussed in more detail below.

The HMS computer system 30 also includes a data entry software program for inputting, at data entry terminal 95, the desired producer 20 registration information. This program utilizes the Microsoft® FoxPro™ user interface and data input tools.

The VIS 80 consists of two conventional Conversant Voice Information Systems (CVIS) manufactured by AT&T. As explained above, two CVIS's are used to handle the expected usage. Each CVIS connects to the public telephone system. Each CVIS is programmed in conventional fashion to provide desired verbal messages and instructions to a caller, and also to respond to telephone keypad entries made by the caller/producer 20. The instructions and menus programmed into each CVIS are discussed in more detail below.

Producer Registration

As indicated above, producer 20 registration information is first obtained from the producer 20. FIG. 2 is a sample registration form that may be used to obtain the producer 20 information. This form could be filled out by the producer 20 when buying seed, in which case the seller of the seed forwards the information for entry into the HMS 10. Alternatively, registration forms could be mailed in. The information could also be taken down by a customer assistance representative over the telephone. In each case, the information is then entered into the producer database 40 manually using the data entry terminal 95.

The producer 20 information, alternatively, could be entered into the HMS 10 in a variety of other ways. For example, the HMS 10 could be configured so that producers 20 use the toll-free number to register their fields by telephone keypad entries. Also, the HMS 10 could be configured so that producers 20 are able to register via the Internet.

Referring to FIG. 2, under the heading "Cooperator Profile", the producer 20 (i.e., the "cooperator") provides personal information, including Name, Social Security Number, Address with Zip code, phone numbers, etc. The producer 20 also may provide "Cropping Information," though this information is not directly pertinent to the quality predictions made in the HMS 10 disclosed herein, but may have value as research data or may become utilized as additional services performed by the HMS 10 are developed. "Herd Profile" and "Ration Profile" information may also be provided, though this information likewise is not directly pertinent to crop quality predictions in their present forms.

The bottom of the form of FIG. 2, under the heading "Alfalfa Field Profile," is where the producer 20 provides pertinent information about the producer's alfalfa fields. Here, information for five different fields can be entered, although the HMS 10 is not limited in this respect. For each field, the producer 20 enters: (1) Field ID/Name—for example, "South 40"; (2) the Variety ID—for example, Sterling Alfalfa; (3) the Seeding Date; (4) Soil Type—for example, clay loam; (5) Irrigation—yes or no; (6) Clear Seeding—yes or no; (7) Nurse Crop—for example, oats; (8) Grass Mix—yes or no; (9) Plants per Square Foot—for example, 10; and (10) Field Zip Code. Again, not all of these data are necessary to obtain a quality prediction in its present form, though the information may be useful as a research tool and may at some time be used in the quality prediction. The field Zip code is especially important because, as will be discussed in more detail below, from it may be derived (1) the latitude and longitude coordinates of the field; (2) an estimate of the elevation of the field; and (3) the distance the field is from nearby weather stations, whose latitude and longitude coordinates are also known.

The information from the registration form shown in FIG. 2 is next manually entered into the producer database 40 using the data entry terminal 95. Some of the entered information is stored in a database file USER.DBF which contains the following database fields:

USER.DBF

| Field Name | Type | Length | Decimal | Description |
| --- | --- | --- | --- | --- |
| USER_ID | C | 5 | 0 | 5-digit ID assigned upon registration. |
| PIN | C | 4 | 0 | 4-digit password. |
| LAST_NAME | C | 20 | 0 | User's last name. |
| FIRST_NAME | C | 20 | 0 | User's first name. |
| MIDDLE_1 | C | 1 | 0 | User's middle initial. |
| FARM_NAME | C | 30 | 0 | Farm name. |
| ADDRESS1 | C | 30 | 0 | First line of address. |
| ADDRESS2 | C | 30 | 0 | Second line of address. |
| CITY | C | 30 | 0 | Address city. |
| STATE | C | 2 | 0 | Address state. |
| ZIPCODE | C | 10 | 0 | Address zip code. |
| COUNTY | C | 30 | 0 | County name. |
| PHONE | C | 10 | 0 | User's phone. |
| PHONE2 | C | 10 | 0 | User's phone. |
| FAX | C | 10 | 0 | Fax number. |
| EMAIL | C | 30 | 0 | Internet address. |
| SSN | C | 11 | 0 | User's social security number. |

-continued

USER.DBF

| Field Name | Type | Length | Decimal | Description |
|---|---|---|---|---|
| REP | C | 35 | 0 | Customer representative. |
| DATE | D | 8 | 0 | Date record was last modified. |
| TIME | C | 8 | 0 | Time record was last modified. |

USER. CDX

| Tag Name | Expression | Filter | Type |
|---|---|---|---|
| USER_ID | USER_ID | 0 | unique |
| PIN | USER_ID + PIN | 0 | unique |

Under the "Type" column in USER.DBF, "C" indicates that the database field contains characters, and "D" indicates dates. The USER.CDX lists the database "tags" for searching the USER.DBF database file. The two tags listed above are "unique" in that they define only a single record in the database file.

User ID's are assigned to each producer 20 during entry of the producer 20 data into the database 40, which information will then be conveyed to the producer 20, for example by mail. When the producer 20 information is added into the database 40, the input program previously discussed retrieves an unused ID from a database file, USERIDS.DBF. The fields contained in this database file are as follows:

USERIDS.DBF

| Field Name | Type | Length | Decimal | Description |
|---|---|---|---|---|
| USER_ID | C | 5 | 0 | User ID. |
| USED | L | 1 | 0 | Has ID been assigned. |
| DATE | D | 8 | 0 | Date ID was assigned. |

USERIDS.CDX

| Tag Name | Expression | Filter | Type |
|---|---|---|---|
| USER_ID | USER_ID | 0 | unique |
| NOT_USED | USER_ID | USED = .F. | regular |

Under the "Type" column in USER.DBF, "L" indicates that the database field is a binary logic type having only two possible values. When the contents of the "USED" field equals "F", then the corresponding User ID has not been assigned. Hence, the tag "NOT_USED" identifies all of the user ID's that are not yet assigned. The tag "NOT_USED" is a "regular" type indicating there may be more than one record (i.e., not unique).

As discussed above in connection with the registration form of FIG. 2, producers 20 provide cropping, herd profile and ration profile information. Whereas the information in the database file USER.DBF usually remains unchanged from year to year, cropping, herd and ration information will typically change from year to year. The database files containing this information are HERD.DBF, CROP.DBF and RATION.DBF. This database file and its database fields are as follows:

HERD.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| COWS | N | 5 | 0 | Number of milking cows. |
| ROLLINGAVG | N | 5 | 0 | Rolling herd average (lbs of milk/yr.). |
| DHIA | L | 1 | 0 | DHIA member? |
| BEEFSTEERS | N | 5 | 0 | Average number of beef steers per year. |
| PIGS | N | 5 | 0 | Average number of pigs fed per year. |

HERD.CDX

| Tag Name | Expression | Filter | Type |
|---|---|---|---|
| USER_ID | USER_ID | 0 | regular |
| USER | USER_ID + YEAR | 0 | regular |

CROP.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| CROP | C | 15 | 0 | Crop name. |
| ACRES | N | 8 | 0 | Acres planted. |

CRCP.CDX

| Tag Name | Expression | Filter | Type |
|---|---|---|---|
| USER_ID | USER_ID | 0 | regular |
| USER | USER_ID + YEAR | 0 | regular |

RATION.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| TMRFEEDER | L | 1 | 0 | Use a TMR feeding system? |
| P_CS | N | 6 | 2 | Percent corn silage in ration (as a % forage in ration). |
| P_ALFALFA | N | 6 | 2 | Percent alfalfa in ration (as a % forage in ration). |
| PRESERVE | L | 1 | 0 | Is a preservative used on the wet forages? |
| COTTONSEED | L | 1 | 0 | Use cotton seeds in ration? |

RATION.CDX

| Tag Name | Expression | Filter | Type |
|---|---|---|---|
| USER_ID | USER_ID | 0 | regular |
| USER | USER_ID + YEAR | 0 | regular |

Under the "Type" column in USER.DBF, "IN" indicates that the database field is a numerical value.

A database file FIELD.DBF contains the information about each field provided on the registration form. Each record in the FIELD.DBF represents one field in one year. For each year/field combination, there is only one record. Field records are entered into, and thus added to, the producer database 40 when the producers 20 register their fields each year.

| Field Name | Type | Length | Decimal | Description |
|---|---|---|---|---|
| USER_ID | C | 5 | 0 | 5-digit ID. |
| YEAR | C | 4 | 0 | Year of registration. |
| FIELD_NUM | C | 2 | 0 | User can have 99 fields per year. |
| FIELD_NAME | C | 30 | 0 | Field name (user defined). |
| ZIPCODE | C | 5 | 0 | Zipcode of field. |
| LATITUDE | N | 12 | 0 | Field's latitude (degrees). |
| LONGITUDE | N | 12 | 0 | Field's longitude (degrees). |
| ELEVATION | N | 5 | 0 | Field's elevation (feed; from user or ZIPCODE.DBF). |

-continued

| Field Name | Type | Length | Decimal | Description |
|---|---|---|---|---|
| IRRIGATION | L | 1 | 0 | Irrigated? |
| SOIL_TYPE | C | 20 | 0 | Soil type (from user). |
| CROP_ID | C | 20 | 0 | Crop (alfalfa). |
| VARIETY | C | 11 | 0 | Crop variety. |
| DATE_SEED | D | 8 | 0 | Date seeded. |
| CLEAR_SEED | L | 1 | 0 | Clear seeded (other crops mixed)? |
| NURSE CROP | C | 20 | 0 | If not clear seeded and a nurse crop mixed, what's the nurse? |
| GRASS_MIX | C | 20 | 0 | If not clear seeded and grass a mixed, what's the grass. |
| PLANTS_SFT | N | 3 | 0 | Plants per square foot. |
| DATE | D | 8 | 0 | Date record was last modified. |
| TIME | C | 8 | 0 | Time record was last modified. |

FIELD.CDX

| Tag Name | Expression | Filter | Type |
|---|---|---|---|
| USER_ID | USER_ID | 0 | regular |
| USER | USER_ID + YEAR | 0 | regular |
| FIELD | USER_ID + YEAR + FIELD_NUM | 0 | unique |

Weather Data

Real-time weather data are obtained by the HMS 10 from a weather data service 50 that collects data from various dispersed sites. One such weather data service 50, which is appropriate because it covers alfalfa growing areas, is the Midwestern Climate Information System (MICIS). The MICIS is operated by the Midwestern Climate Center (MCC), Champaign, Ill. The MCC is a cooperative program of the Illinois State Water Survey and the National Weather Service (NWS). The MICIS includes a database of real-time weather data collected from several hundred climate stations throughout the Midwestern United States. The MICIS includes data primarily from Illinois, Indiana, Iowa, Kentucky, Michigan, Minnesota, Missouri, Ohio and Wisconsin.

The MICIS weather data are collected in several ways. First, cooperative observers make observations at scheduled times and call in their observations by telephone to a local NWS office, which in turn transmits the data over a national network. Other observers are event reporters in that they report their observations only when certain criteria are met, for example, only when precipitation occurs. The number of observations by event reporters depends on the weather, there being more reports typically when precipitation is occurring. Hourly surface airways reports from NWS first-order stations are another component of the MICIS real-time weather database. From these reports are calculated daily average values of temperature, relative humidity, potential evapotranspiration, dewpoint temperature, solar radiation, wind speed, wind direction, air pressure and cloud cover.

The MCC offers an MICIS subscription service that allows viewing of various raw and processed weather data. The HMS 10 is a subscriber. In addition, upon a request of a subscriber, the MCC will place requested weather data in a file in a subscriber home directory residing in the MICIS. Using the software program called "FetchMCC" (discussed previously), that weather data is downloaded from the MICIS. In the present application, the MCC updates a file in the HMS's home directory on the MICIS with weather data received since the last update. This updating of the file occurs seven times a day. This file is a text file (ASCII). Each line in the MCC text file represents one weather observation. The format is as follows:

$$YY{:}DDD\ SSSSS\ NNNNNNN\ T\ 999999.99$$

where:

YY=last 2 digits of year for this weather observation;

:=a literal to separate year and day;

DDD=the day of the year for this weather observation;

SSSSS=weather station SHEF ID code;

NNNNNNN=weather station NCDC ID code;

T=code for type of observation, where:
P=precipitation;
L=low temperature;
H=high temperature; and
S=solar radiation; and 999999.99=observation value.

Thus it is seen in the present application that precipitation, temperature and solar radiation data are the only weather data retrieved from the MCC. The weather data obtained depends on what is needed for the particular crop characteristic prediction equation, and what data is being studied for further development and refinement of the prediction equation.

The FetchMCC software program running on the weather computer 60 automatically retrieves the weather data from the MICIS via the Internet using the File Transfer Protocol (FTP). Once a day, the FetchMCC program logs onto the MICIS system over the Internet. After logging on to the MICIS, FetchMCC changes the name of the data file from "data" to a name that includes the date and time. The renamed file is then downloaded to the weather computer 60.

The downloaded weather data text file is parsed into a database file WEATHER.DBF which is contained in the weather database 70. This involves copying the downloaded weather data with no processing. At this point, invalid records are filtered out. While these records are being processed, the FetchMCC program keeps track of the earliest observation data. This is used later when processing the weather data with the field data.

Two additional database files contained in the weather database 70 relate to the downloaded MICIS weather data. The first is a database file WSTATION.DBF which contains information about the weather stations whose data are collected by the MICIS.

WSTATION.DBF

| Field Name | Type | Length | Decimal | Description |
|---|---|---|---|---|
| STATION_ID | C | 7 | 0 | Weather Service station ID. |
| NCDC_CODE | C | 7 | 0 | Weather Service 7-digit station ID. |
| SHEF_CODE | C | 5 | 0 | Another code for the station. |
| LATITUDE | N | 12 | 5 | Station latitude (degrees) |
| LONGITUDE | N | 12 | 5 | Station longitude (degrees). |
| ELEVATION | N | 5 | 0 | Station elevation (feet above sea level). |
| TYPE | C | 1 | 0 | Code indicating type of station. |
| PRECIP | L | 1 | 0 | Report precips? |
| TEMP | L | 1 | 0 | Report low/high temperature? |
| SOLAR | L | 1 | 0 | Report solar radiation? |

-continued

WSTATION.DBF

| Field Name | Type | Length | Decimal | Description |
|---|---|---|---|---|

WSTATION.CDX

| Tag Name | Expression | Filter | Type |
|---|---|---|---|
| STATION_ID | STATION_ID | 0 | unique |
| NCDC_CODE | NCDC_CODE | 0 | regular |
| SHEF_CODE | SHEF_CODE | 0 | regular |

The WSTATION.DBF database file uniquely identifies weather stations by two codes. The primary weather station ID code is the STATION_ID field, which is a unique field usually containing a seven-digit "NCDC" weather station code. However, some stations have no NCDC code, so a character code is used for these stations. A "SHEF" code is another code for stations. The SHEF code is unique for every station from which the MICIS receives data.

Second, a database file WEATHER.DBF contains the actual weather data downloaded from the MICIS. Each record in this file is weather data for a station for a given day. This file is modified daily as weather data is retrieved from the MCC. The WEATHER.DBF database file is as follows:

WEATHER.DBF

| Field Name | Type | Length | Decimal | Description |
|---|---|---|---|---|
| STATION_ID | C | 7 | 0 | Weather Service 7-digit station ID. |
| DATE | D | 8 | 0 | Date of data. |
| PRECIP | N | 6 | 2 | Precipitation (inches). |
| LOW_TEMP | N | 6 | 2 | Daily low temperature (°F.) |
| HIGH_TEMP | N | 6 | 2 | Daily high temperature (°F.) |
| SOLAR | N | 6 | 2 | Daily solar radiation value computed by MCC. |

WEATHER.CDX

| Tag Name | Expression | Filter | Type |
|---|---|---|---|
| STATION_ID | STATION_ID | 0 | regular |
| STA_DATE | STATION_ID + DTOC(DATE,1) | 0 | unique |

After weather data are downloaded and parsed into the weather database 70, the weather computer 60 immediately processes the downloaded weather data. This processing is performed to obtain an estimate of the weather that has occurred in each of the registered fields. This requires significant processing capability. The processing is performed immediately so that the field-specific weather information is immediately available when a producer 20 telephones the HMS 10 for a prediction. Processing of the downloaded weather data could, alternatively, be performed only when a producer 20 requests a prediction, if the processing capability is sufficient so that processing at that time would not cause undesirable delays in obtaining a prediction from the HMS 10.

For each active field in the FIELD.DBF database file, each day's accumulated growing degree day (GDD) measure (the GDD measure for the day equalling the mean temperature calculated from the high and low temperatures), precipitation, and solar radiation are computed and placed in a FWEATHER.DBF database file that is discussed in more detail below.

To make a weather estimate for each field, it is necessary to determine what weather data apply to each registered field. Generally, the weather data for each field are determined by using weather data from the five nearest weather stations. Fields and weather stations are tied together with a database file FLD_STA.DBF, which is as follows:

FLD_STA.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| FIELD-NUM | C | 2 | 0 | User can have 99 fields per year. |
| STATION_ID | C | 7 | 0 | Weather Service 7-digit station ID. |
| DISTANCE | N | 6 | 1 | Distance between weather station and field. |
| ELEV_DIFF | N | 6 | 0 | Elevation difference between station and field. |

FLD_STA.CDX

| Tag Name | Expression | Filter | Type |
|---|---|---|---|
| FIELD | USER_ID + YEAR + FIELD_NUM | 0 | regular |
| STATION_ID | STATION_ID | 0 | regular |

Each record in FLD_STA.DBF contains a field ID, a station ID, and the distance between the field and the station. The distance measure is calculated from longitude and latitude coordinates for the field (see FIELD.DBF) and the weather station (see WSTATION.DBF), as is discussed in more detail below.

For each active registered field there will be a minimum of 50 records in the FLD_STA.DBF. Generally, the number of records depends on the type of weather stations near the field. At the time the FetchMCC program downloads weather data from the MICIS, a check is made to determine that for each active field in the FIELD.DBF table, there are records in the FLD_STA.DBF table. If not (indicating that a new field registration has just been entered into the HMS 10), a Fetch_MCC.EXE program computes the 50 nearest stations and adds these records to the table. There are 50 records in the FLD_STA.DBF database file for each active registered field because many of the weather stations do not report data every day, as discussed above.

Distance between weather stations and registered fields is determined as follows. First, when a field is input into the HMS 10, the input software program determines the latitude, longitude and elevation for the field from the Zip code using the following database file:

ZIP_POSN.DBF

| Field Name | Type | Length | Decimal | Description |
|---|---|---|---|---|
| ZIPCODE | C | 5 | 0 | Zip code. |
| LATITUDE | N | 12 | 5 | Latitude at centroid of zip code (degrees). |
| LONGITUDE | N | 12 | 5 | Longitude at centroid of zip code (degrees). |
| ELEVATION | N | 5 | 0 | Elevation at centroid of zip code (feet). |

ZIP_POSN.CDX

| Tag Name | Expression | Filter | Type |
|---|---|---|---|
| ZIPCODE | ZIPCODE | 0 | unique |

The latitude and longitude coordinates for each weather station are contained in the WSTATION.DBF table. From the latitude and longitude for each station and each field, a distance measure can be found using the following equation:

DISTANCE = acos [sin (FIELD_LATITUDE)
* sin (WSTATION_LATITUDE)
+ cos (FIELD_LATITUDE)
* cos (WSTATION_LATITUDE) * cos (a)]

where the variable "a" equals the absolute value of the longitude of the field minus the longitude of the weather station, and where all latitude and longitude measures are in radians. If "a" is greater than $\pi$, it is subtracted from $2\pi$ and the resulting number is used.

The weather computer 60 calculates an estimate of the daily weather values estimate of (1) growing degree days (GDD) from a base temperature of 41° F., (2) precipitation, and (3) solar radiation for each field using the following equation:

$$V_{estimate} = \left( \sum_{i=1}^{N} \frac{V_i}{D_i} \right) / \left( \sum_{i=1}^{N} \frac{1}{D_i} \right)$$

where $V_i$ equals the weather value reported for weather station i, $D_i$ equals the distance between the field and weather station i in miles, and N equals the number of weather stations used for the day. The number N is typically five but may be as few as three in areas such as Nebraska where the weather stations may be relatively far apart. The weather stations that are used to calculate the daily values for each field may change from day to day, depending on which weather stations have reported on any given day and which of those are closest to the field.

Accumulated weather values (again, GDD, precipitation and solar radiation) for a field on a given day in the growing season are given by the following equation:

$$V_{cum,estimate} = \sum_{j=1}^{T} \left[ \frac{\left( \sum_{i=1}^{N_j} V_{ji}/D_{ji} \right)}{\left( \sum_{i=1}^{N_j} \frac{1}{D_{ji}} \right)} \right]$$

where $V_{ji}$ equals the weather value reported for weather station i on day j of the growing season, $D_{ji}$ equals the distance between the field and weather station i in miles on day j, $N_j$ equals the number of weather stations used for day j, and T equals the growing season day for which weather data are being accumulated. When used in the prediction equation (discussed later), the daily accumulated value is accumulated from either the beginning of the growing season (for first cuttings) or from the most previous cutting (for subsequent cuttings). The day of the beginning of the growing season may be, for example, March 1.

The accumulated weather values from the beginning of the growing season for each registered field are stored by the weather computer 60 in the producer database 40, in the following database file:

FWEATHER.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| FIELD-NUM | C | 2 | 0 | Field number. |
| DATE | D | 8 | 0 | Date for which data is accumulated. |

-continued

FWEATHER.DBF

| Field Name | Type | Length | Decimal | Description |
|---|---|---|---|---|
| GDD | N | 10 | 2 | Accumulated Growing Degree Day value. |
| GDD_D | N | 10 | 1 | Accumulated average distance (mi) for temperature. |
| GDD_E | N | 10 | 0 | Accumulated elevation difference (ft) for temperature. |
| PRECIP | N | 10 | 2 | Accumulated precipitation value. |
| PRECIP_D | N | 10 | 1 | Accumulated average distance (mi) for precipitation. |
| PRECIP_E | N | 10 | 0 | Accumulated average elevation difference (ft) for precipitation. |
| SOLAR | N | 10 | 2 | Accumulated solar radiation value. |
| SOLAR_D | N | 10 | 1 | Accumulated average distance (mi) for solar radiation. |
| SOLAR_E | N | 10 | 0 | Accumulated average elevation difference (ft) for solar radiation. |

FWEATHER.CDX

| Tag Name | Expression | Filter | Type |
|---|---|---|---|
| FIELD | USER_ID + YEAR + FIELD_NUM | 0 | regular |
| FIELD_DATE | USER_ID + YEAR + FIELD_NUM + DTOC (DATE, 1) | 0 | unique |

Field weather information, alternatively or additionally, could be provided by producers 20. The producer 20 may have one or more self-contained weather stations which are becoming increasingly sophisticated and affordable. Weather data for fields derived from these self-contained weather stations could be input by producers 20 into the producer data 40 using the VIS 80 or other user interface. In this case, the producer 20 could be provided a crop quality prediction calculated using either the producer-provided field weather information or an estimate of the field weather using the weather data service 50 data, or both. Even where a producer 20 has one or more self-contained weather stations, the producer 20 still benefits from using the HMS 10; the raw weather data obtained from the self-contained weather station may not be in a form for entry into the particular crop characteristic equation being utilized and thus may require additional processing by the weather computer 60.

As discussed previously, cut information is needed to calculate accumulated weather values for subsequent cuttings. Cut dates are also contained in the producer database 40 after they have been provided to the system via the VIS 80, as will be discussed below. Cut information is contained in the following database file:

CUT.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| FIELD_NUM | C | 2 | 0 | Field number. |
| CALL_DATE | D | 8 | 0 | Date of call. |
| CALL_TIME | C | 6 | 0 | Time of call. |
| CUTTING | N | 1 | 0 | Cutting number (1, 2, or 3) |

-continued

CUT.DBF

| Field Name | Type | Length | Decimal | Description |
|---|---|---|---|---|
| CUT_DATE | D | 8 | 0 | Date of last cutting. |
| PLNT_HT | N | 4 | 0 | Plant height (inches) when harvested. |
| IRRIGATION | N | 5 | 1 | Irrigation since last cutting or 3/1? in inches. |
| SOIL_H2O | N | 2 | 0 | Code for user entered soil moisture. |
| INSECT | N | 2 | 0 | Code for insect pressure. |
| DISEASE | N | 2 | 0 | Code for plant health. |
| NDF | N | 5 | 2 | Measured NDF value. |
| LAB | C | 5 | 0 | Code for lab that measure NDF. |
| DATE | D | 8 | 0 | Date record was last modified. |
| TIME | C | 8 | 0 | Time record was last modified. |

CUT.CDX

| Tag Name | Expression | Filter | Type |
|---|---|---|---|
| USER_ID | USER_ID | 0 | regular |
| USER | USER_ID + YEAR | 0 | regular |
| FIELD | USER_ID + YEAR + FIELD_NUM | 0 | regular |

As indicated, actual lab-tested NDF values may be entered into the CUT.DBF file. That information may be forwarded by a testing agency to be entered into the producer database 90 using data entry terminal 95. The lab-tested NDF values are used to evaluate the accuracy of the prediction equation and to refine the equation as more data are collected.

For the first cutting, the record in the FWEATHER.DBF database file corresponding to the desired cutting date will give the data needed to compute an NDF content prediction. For second and third cuttings, the data in the record corresponding to the previous cutting date (the previous cutting date being ascertained from CUT.DBF) subtracted from the data in the record corresponding to the desired cutting date will give the accumulated values needed for the prediction equations.

Prediction Database Files

Every time that a producer 20 calls in to the HMS 10 and obtains a quality prediction, a record of that prediction is stored in the producer database 40. This allows tracking of prediction information given to users. The database file where this is stored is as follows:

PREDICT.DBF

| Field Name | Type | Length | Decimal | Description |
|---|---|---|---|---|
| USER_ID | C | 5 | 0 | 5-digit ID. |
| YEAR | C | 4 | 0 | Year of registration. |
| FIELD_NUM | C | 2 | 0 | Field number. |
| CALL_DATE | D | 8 | 0 | Date of call. |
| CALL_TIME | C | 6 | 0 | Time of call. |
| CUTTING | N | 1 | 0 | Current cutting number (1, 2, or 3) |
| LAST_CUT | D | 8 | 0 | Date of last cutting (if > 1) |
| PLNT_HT | N | 4 | 0 | Plant height (inches). |
| IRRIGATION | N | 5 | 1 | Irrigation since last cutting or 3/1? in inches. |
| SOIL_H2O | N | 1 | 0 | Code for user entered soil moisture. |
| INSECT | N | 1 | 0 | Code for inspect pressure. |
| DISEASE | N | 1 | 0 | Code for plant health. |
| NDF | N | 4 | 1 | Predicted NDF value. |
| NDF_RANGE | N | 4 | 1 | NDF range. |

-continued

PREDICT.DBF

| Field Name | Type | Length | Decimal | Description |
|---|---|---|---|---|
| NDF_CONF | N | 4 | 1 | Confidence interval on NDF range. |

PREDICT.CDX

| Tag Name | Expression | Filter | Type |
|---|---|---|---|
| FIELD | USER ID + YEAR + FIELD_NUM | 0 | regular |

The User Interface

As discussed previously, the means by which producers 20 interact with the HMS 10 is the VIS 80. FIGS. 3–18 are flow diagrams for the VIS 80 (see FIG. 1). As is shown in FIG. 3, a producer 20 is offered four options when he calls in to the HMS 10. The producer may: (1) obtain a prediction of an alfalfa crop; (2) report an alfalfa cutting date; (3) register for the HMS 10; or (4) obtain information about the system. The producer presses a "1" at this point to obtain a prediction.

Figure 5:
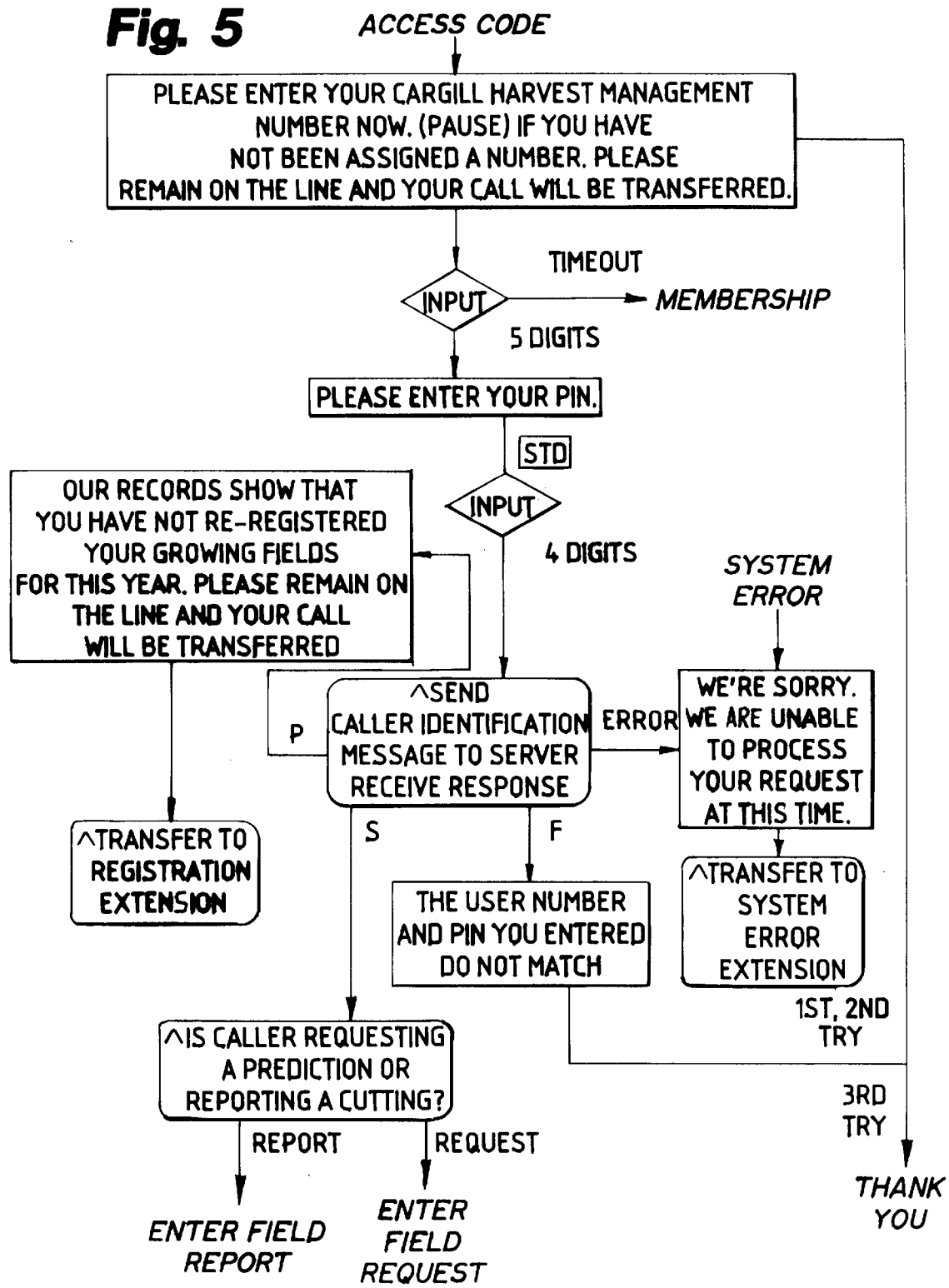
Figure 6:
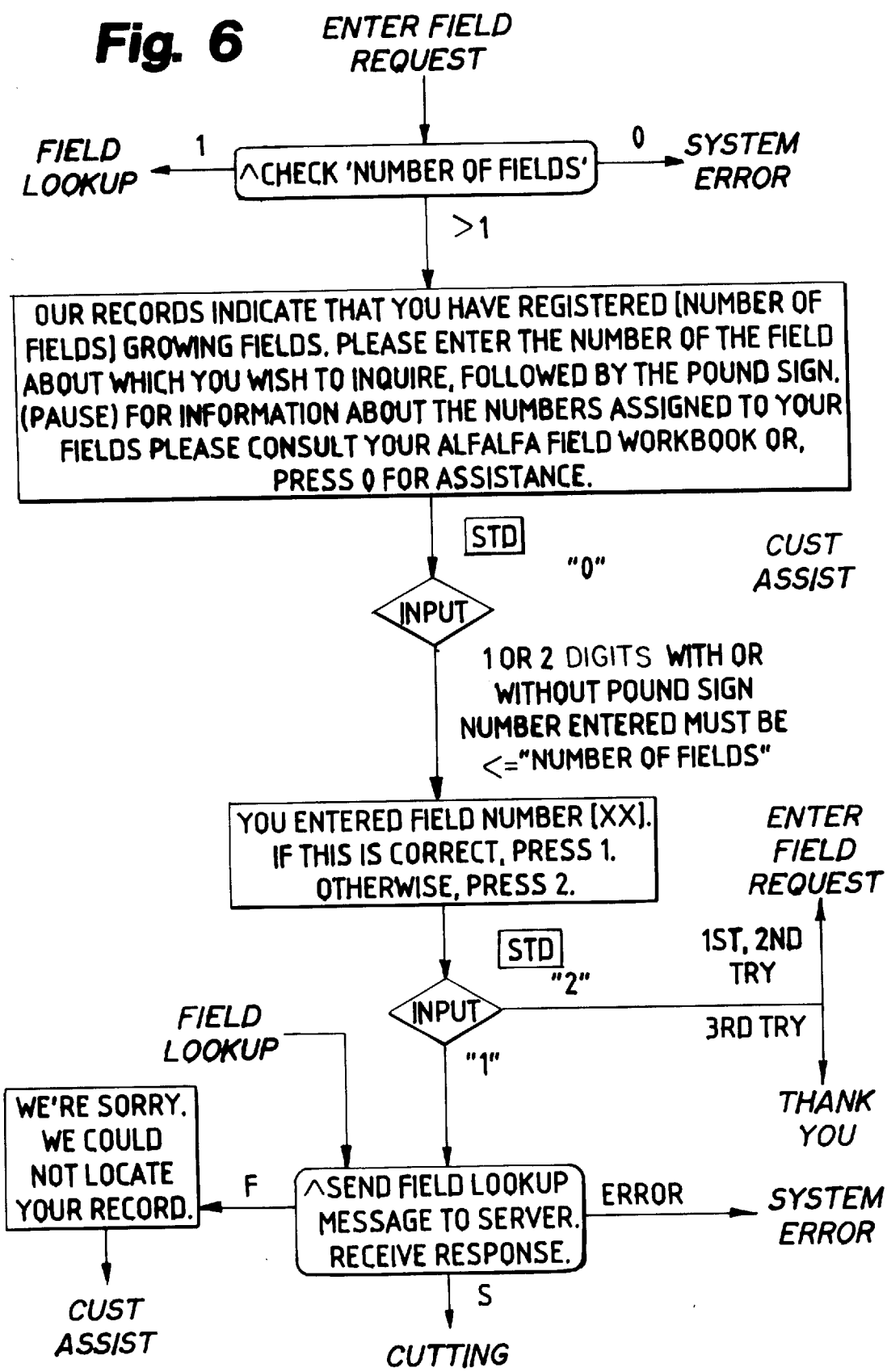
Figure 7:
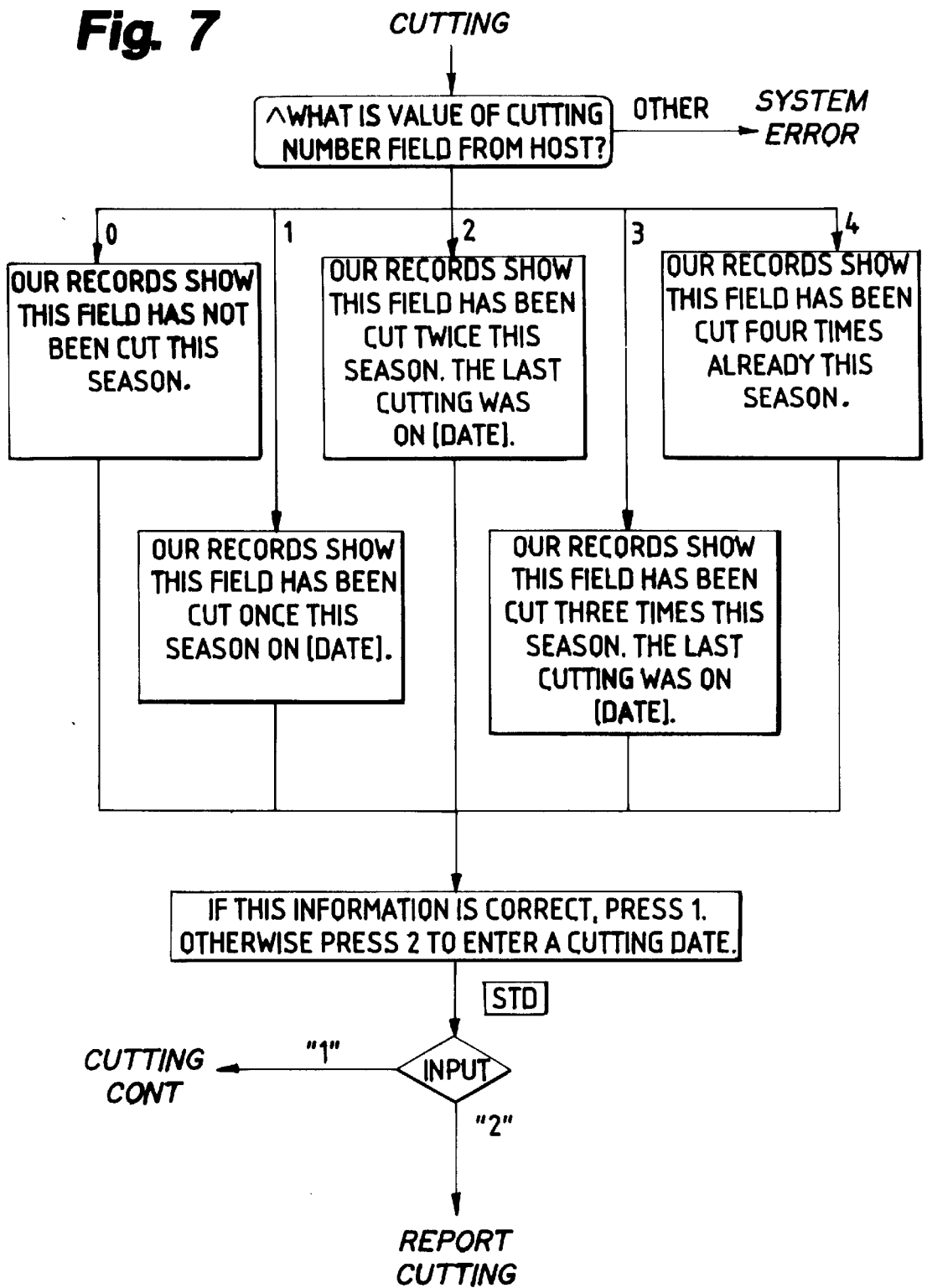
Figure 8:
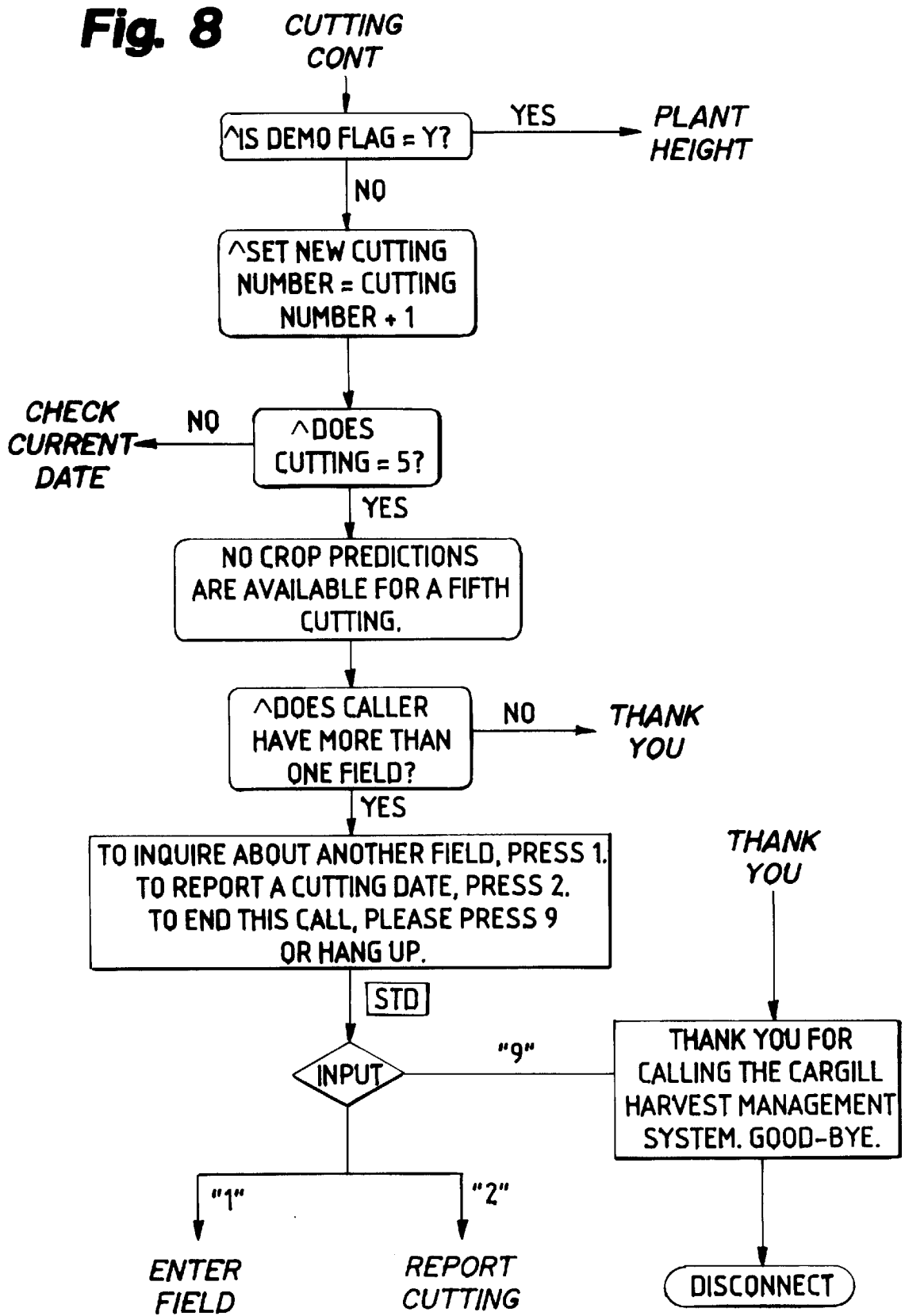
Figure 9:
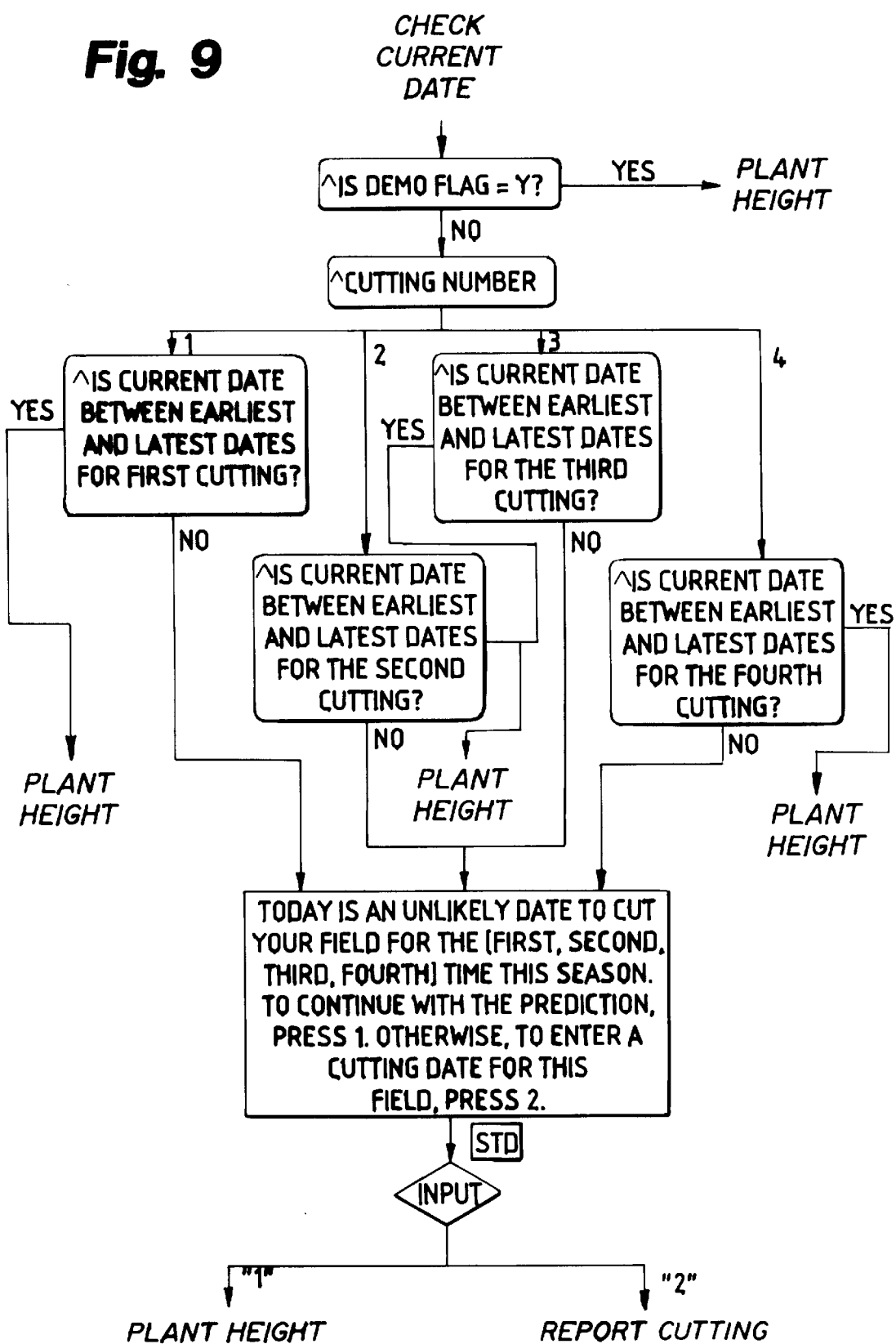

Then, as shown on FIG. 5, the producer 20 enters a User ID number and a PIN. Assuming this is done correctly and the producer 20 has already been registered for the current year, the producer enters the field for which he would like a prediction, as shown in FIG. 6. At this point, the producer computer 90 obtains information about the field from the producer database 40. After this is done, the VIS 80 informs the producer 20 if and when the selected field was last cut, as shown in FIG. 7. Assuming this information is correct (i.e., the producer 20 does not have to first report an earlier cut), and also assuming there have not been four or more previous cuts (see FIG. 8), the HMS 10 determines and informs the producer 20 as to whether the current date is a likely cutting date for the number of the cutting, as is shown in FIG. 9.

Figure 10:
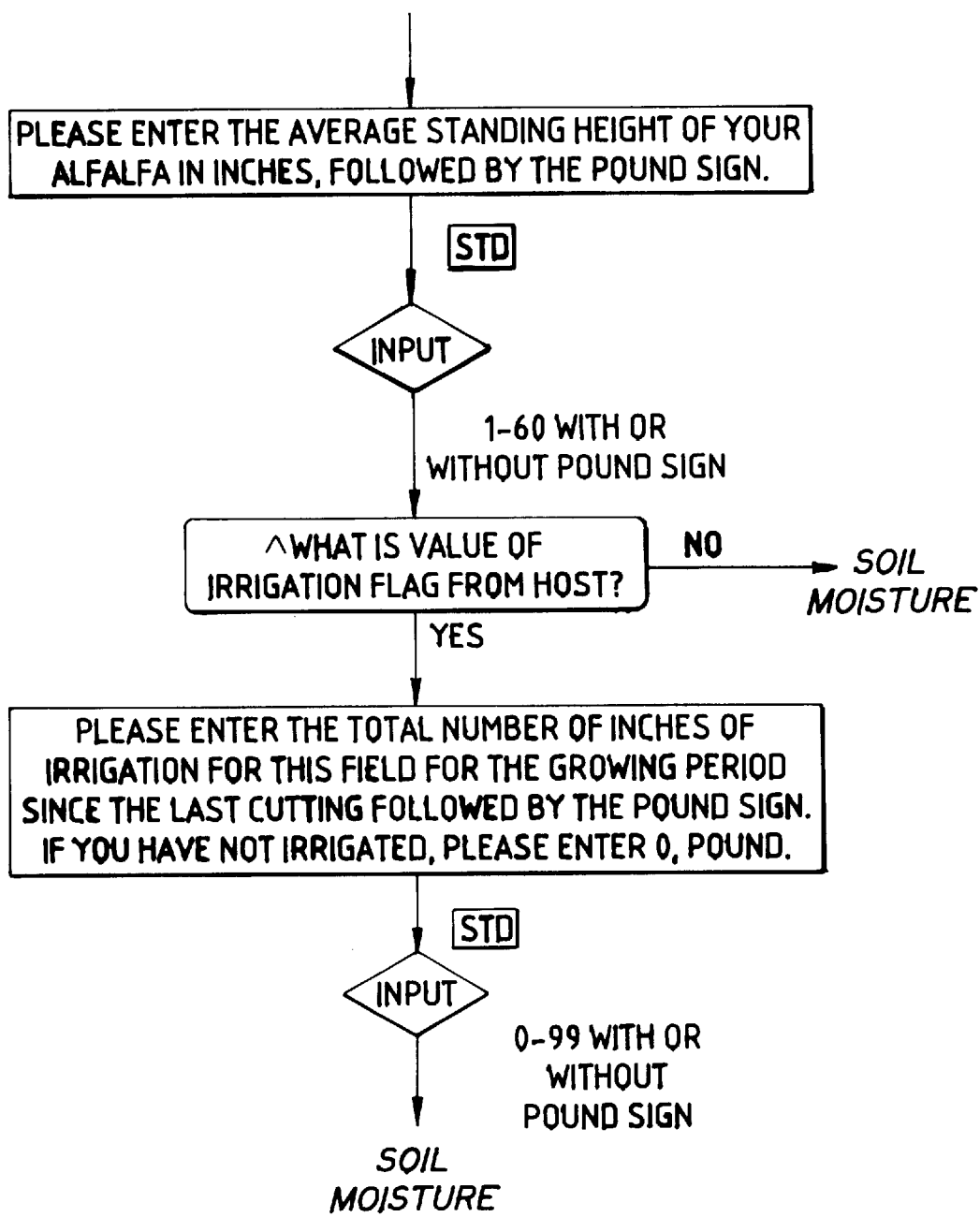
Figure 11:
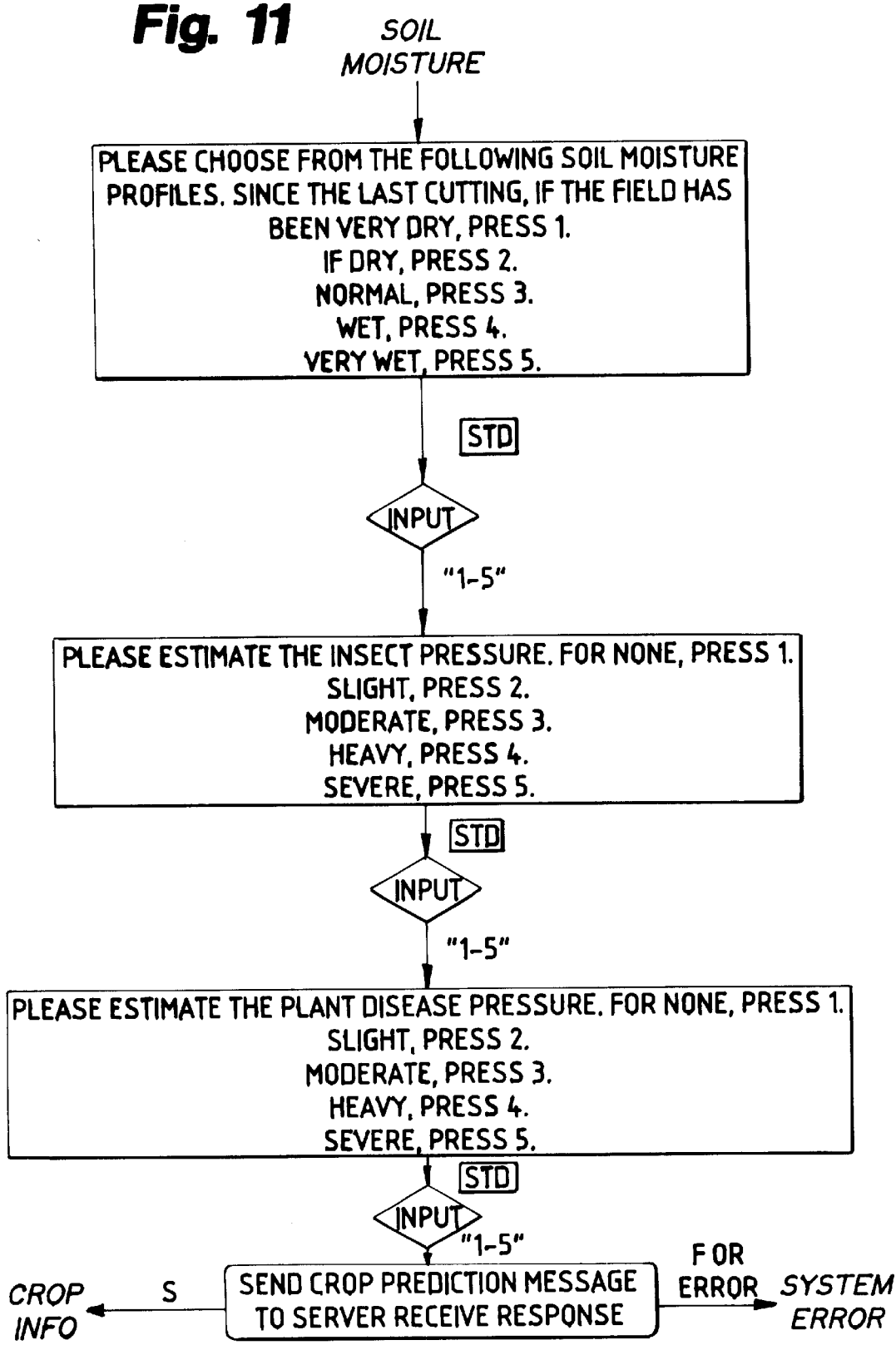

Next, referring to FIG. 10, the producer 20 enters the average height of alfalfa in the selected field and, if the selected field has been irrigated (which information is determined from the FIELD.DBF), the total number of inches of irrigation for this field for the growing period since the last cutting. Then, referring to FIG. 11, the producer 20 enters information about the soil moisture profile from a set of five options ranging from very dry to very wet. Still referring to FIG. 11, the producer then inputs the insect and plant disease pressures for the field. In each case the producer is provided a range of options from which to choose, as indicated in the figure.

Figure 12:
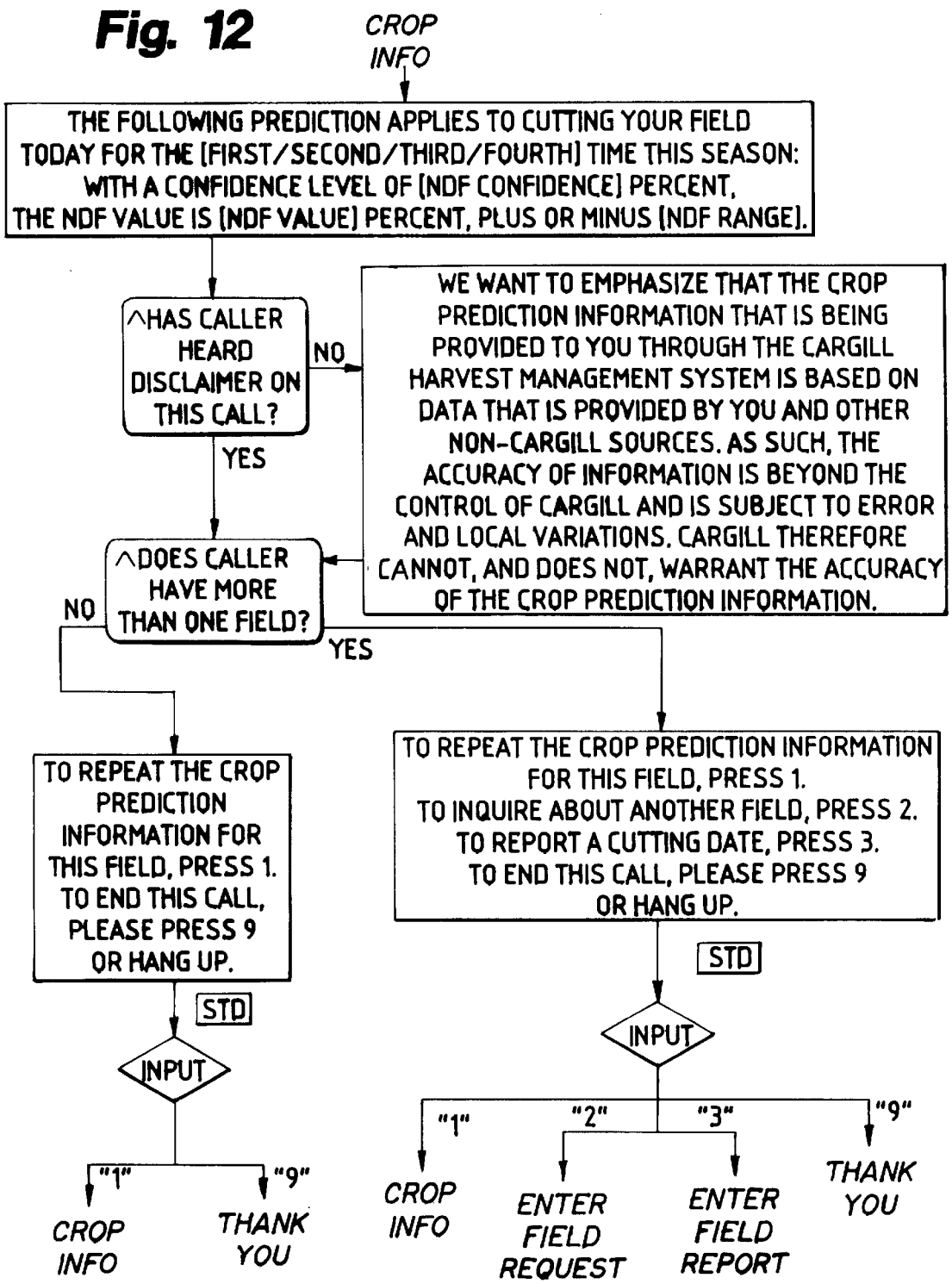

At this point, a message is sent from the VIS 80 to the producer computer 90 telling the producer computer 90 to make a prediction. From the information in the producer database 40 and using an NDF prediction equation that is discussed in more detail below, a prediction for NDF is calculated. After a prediction is calculated, it is forwarded to the VIS 80 which reports the prediction to the producer 20, as depicted in FIG. 12. The NDF value, with a plus and minus range and a confidence level, are provided to the producer 20. The producer 20 then hears a disclaimer on the prediction. The producer 20 can then have the prediction information repeated if he wishes.

If this is the only field for the producer 20, the telephone call ends at this point, as shown in FIG. 12. If the producer has other fields, the producer 20 is given the option of inquiring about another field, reporting a cut date, or ending the call.

Figure 13:
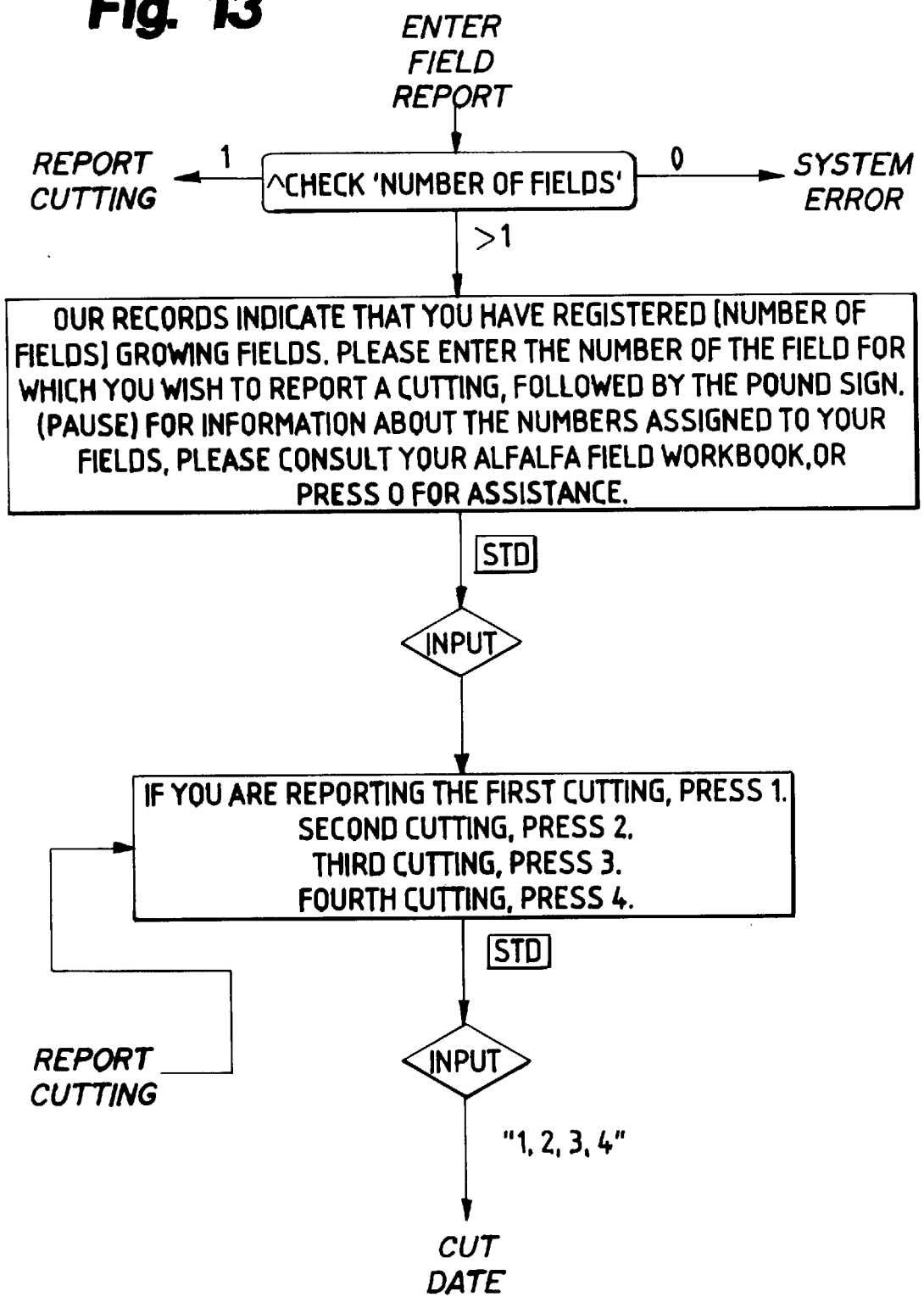
Figure 14:
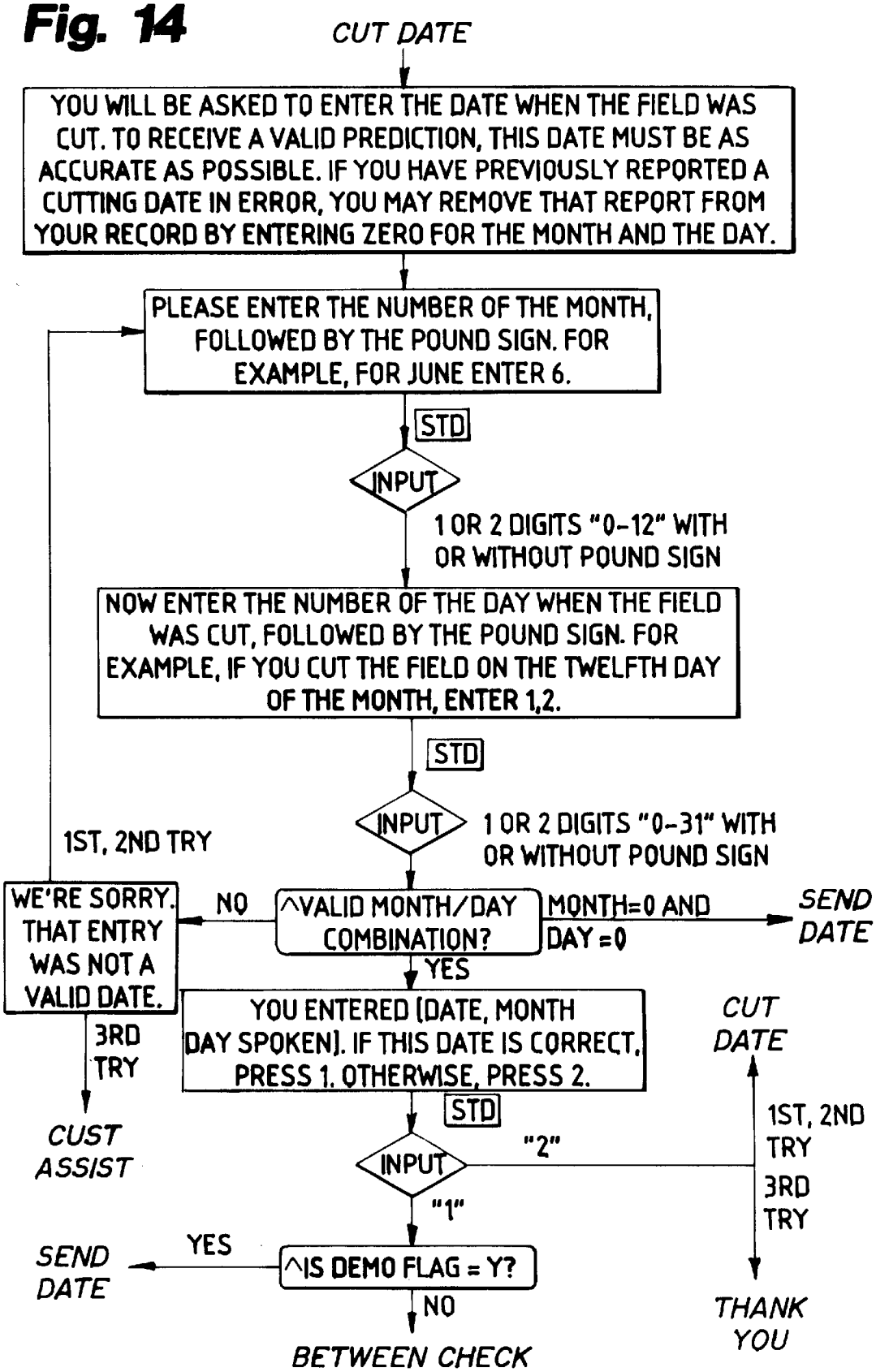
Figure 15:
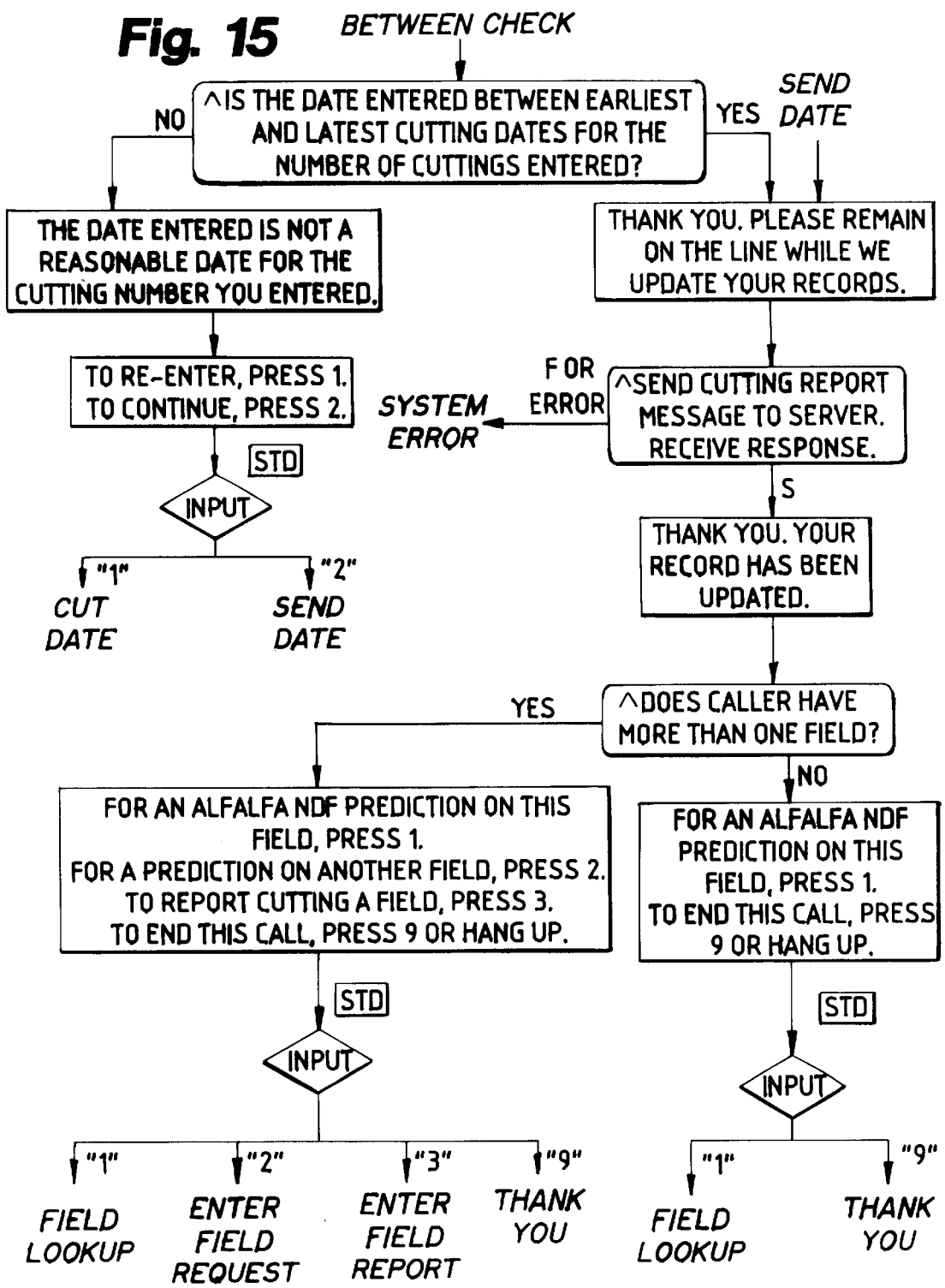

Referring back to FIG. 3, if the producer 20 desires to report a cutting (for example, by pressing "2" when the option is presented), then, the producer is asked to select the field for which the report is going to be made, as shown in FIG. 13. The producer 20 then enters the number of the cutting that is being reported (e.g., first, second, etc.) and the date of the cutting, as shown in FIGS. 13 and 14. Then, as indicated in FIG. 15, the producer computer 90 determines whether the entered date is a reasonable date for the number of the cutting. If so, then the entered cutting data are stored into the producer database 40, as indicated in FIG. 15 by a "Cutting Report Message" being sent to the server. After this is done, the producer 20 is given the option of obtaining an NDF prediction for the field or ending the call, or, if the producer 20 has other fields, the producer 20 at this time can obtain an NDF prediction for another field or may report a cutting of another field, as shown in FIG. 15.

Figure 16:
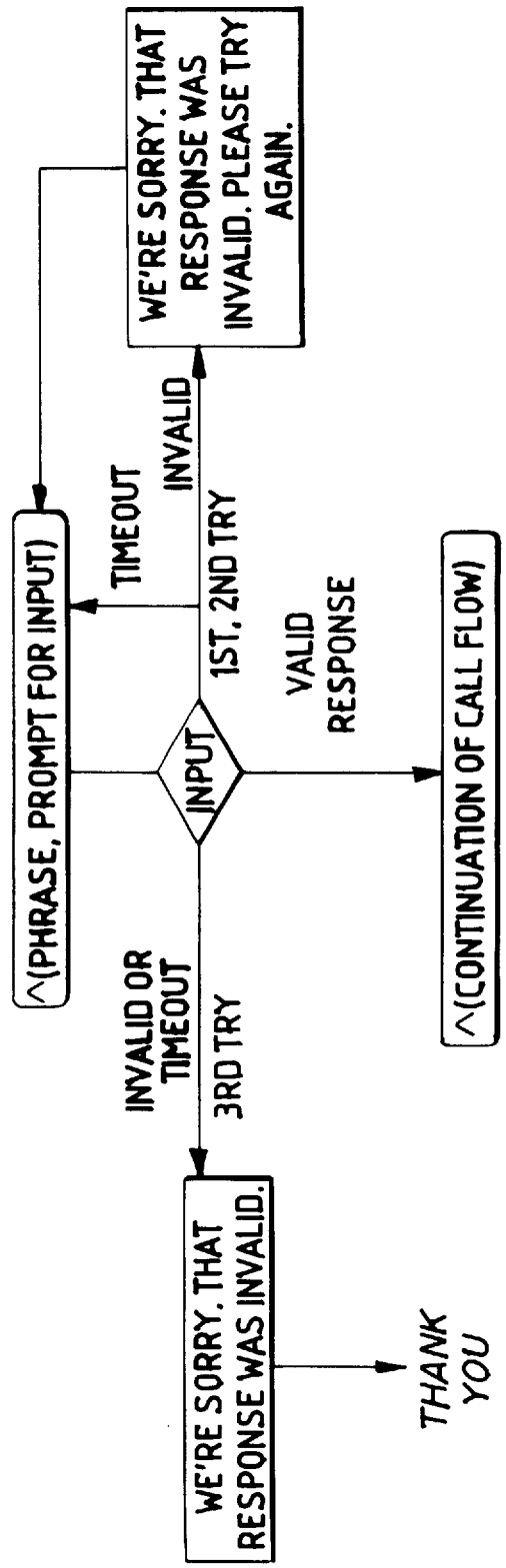

FIG. 16 shows how the VIS 80 responds when a producer 20 enters a telephone keypad number that is not among one of the options. This flow chart of FIG. 16 is referenced at various points in the flow chart, as indicated by the "STD" annotation in a box (see, for example, FIG. 3).

Figure 17:
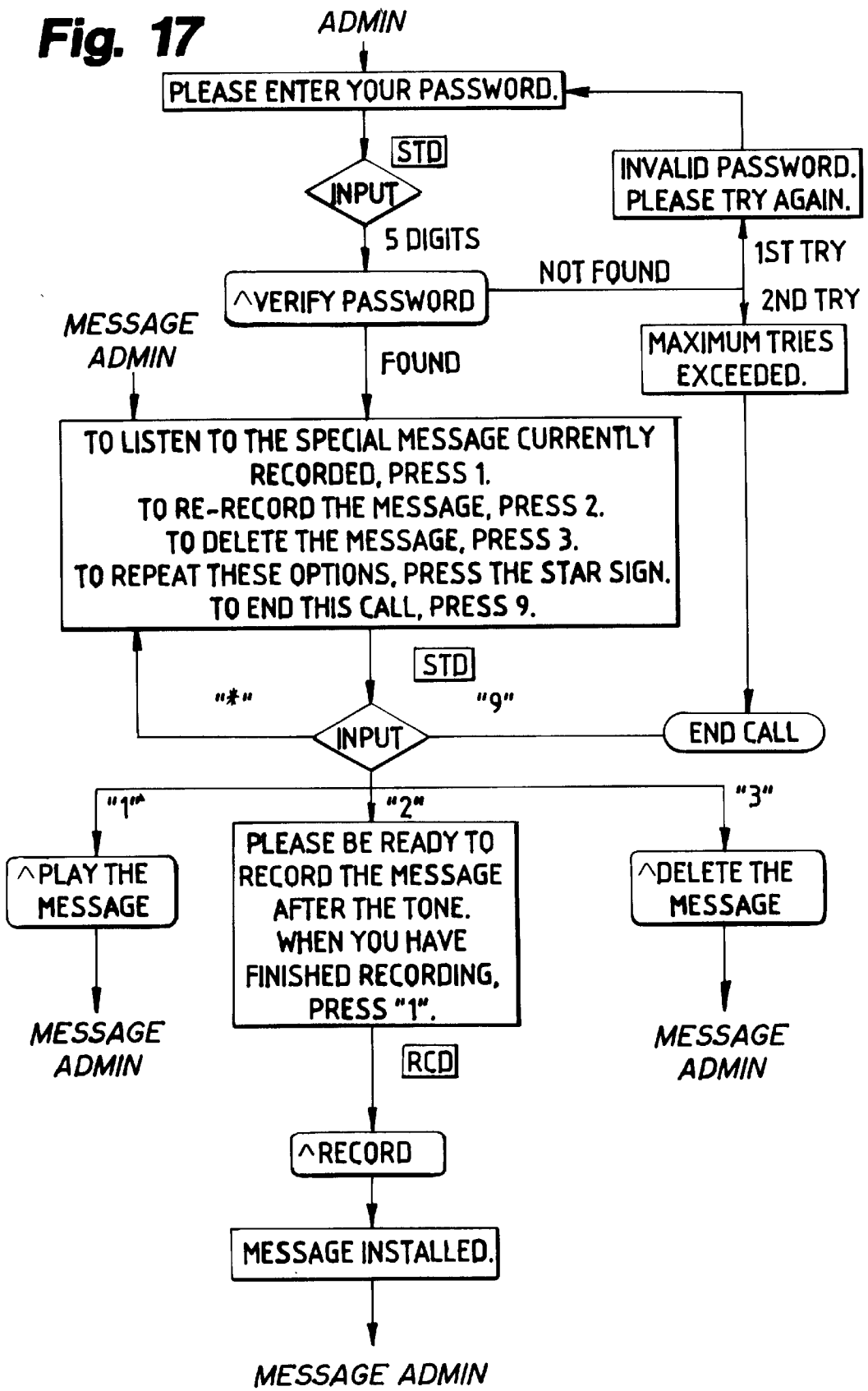
Figure 18:
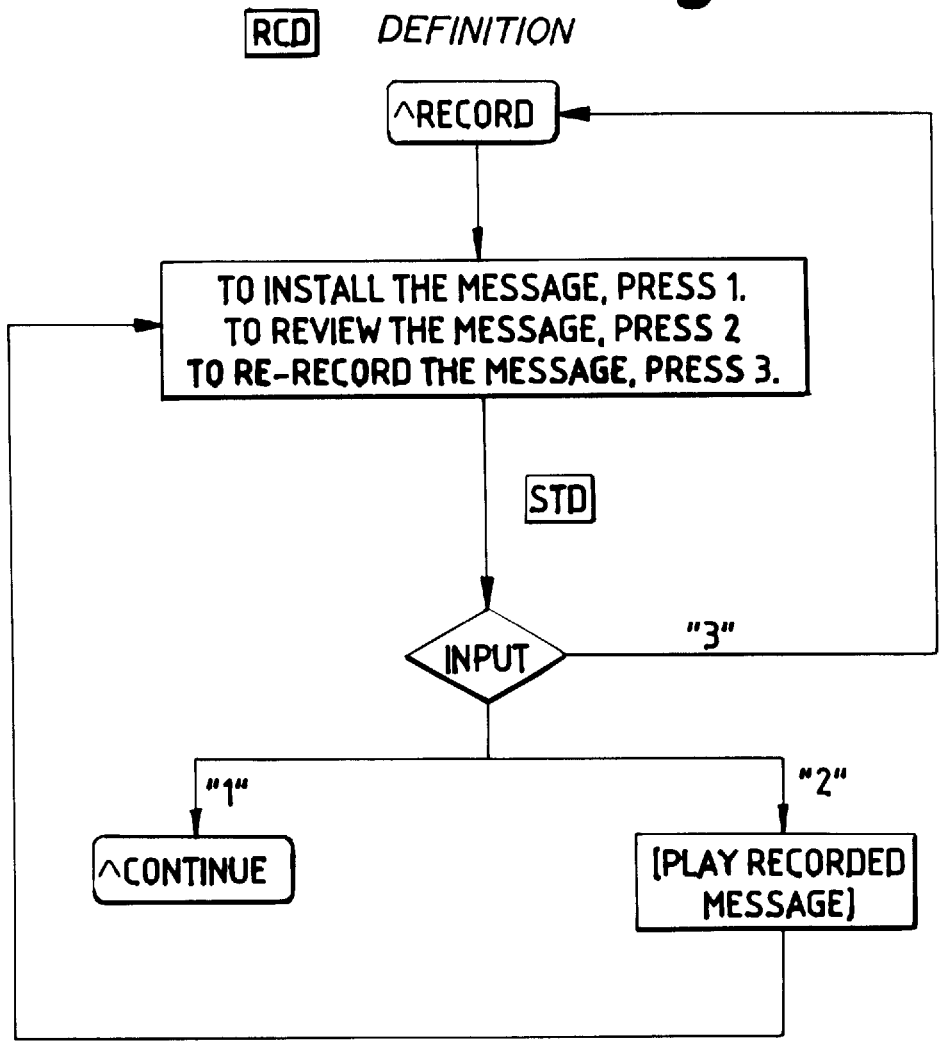

FIGS. 17 and 18 show how a system administrator records a special message that may be heard by a caller (see FIG. 3 where the special message is played without interrupt). After the administrator enters "*7" (see FIG. 3) and a valid password (FIG. 17), the administrator may listen to the special message currently recorded, re-record a message, or delete the message, as shown in FIG. 17. A message may be recorded at this time, as indicated in FIGS. 17 and 18. In addition, for demonstration and training during the off-season, callers may enter "*1" (see FIG. 3) at the welcome message to reach the full main menu. Finally, if a producer/caller wishes general information about the HMS 10, the producer enters a "4" from the first menu (FIG. 3), whereupon the producer hears the information message shown on FIG. 4.

As discussed above, the VIS 80 and the producer computer 90 exchange data for interactive use during the telephone call. This exchange is accomplished using an application program interface to a communication protocol specification called the "Berkeley Sockets Interface" which is used to send TCP packets over a Local Area Network. (See W. Richard Sterns, *Unix Network Programming*, pp. 258–87, Prentice-Hall.) The VIS 80 acts as a client and the producer computer 90 as the server in the client-server model.

Four message sets are used to exchange data between the VIS 80 and the producer computer 90. The messages exchanged include the following: (1) a caller identification message; (2) a field look-up message; (3) a crop prediction message; and (4) a cutting report message. The data exchanged between the VIS 80 and the producer computer 90 are transmitted as ASCII characters, eliminating the need for an interpretation of binary integer format between different system architectures. The four messages and their contents are as follows:

(1) Caller Identification Message

| | Field | Size | Value |
|---|---|---|---|
| To server (i.e., from the VIS 80 | Message ID | 2 | 01 (Caller Identification) |

-continued (1) Caller Identification Message

| | Field | Size | Value |
|---|---|---|---|
| to the producer computer 90): | | | |
| | Caller number | 5 | 5 digits entered by caller |
| | PIN | 4 | 4 digits entered by caller |
| From server: | Message ID | 2 | 01 (Caller Identitication) |
| | Caller number | 5 | 5 digits entered by caller |
| | Response | 1 | S - Success, caller number and PIN found |
| | | | F - Failure |
| | | | P - Previous user not registered this year |
| | Number of Growing Fields | 2 | 01 to 99 |

(2) Field Lookup Message

| | Field | Size | Value |
|---|---|---|---|
| To server: | Message ID | 2 | 02 (Field lookup) |
| | Caller number | 5 | 5 digits entered by caller |
| | Growing field number | 2 | 01 to 99 |
| From server: | Message ID | 2 | 02 (Field lookup) |
| | Caller number | 5 | 5 digits entered by caller |
| | Response | 1 | S - success, valid field for this caller number |
| | | | F - failure |
| | Growing field number | 2 | 01 to 99 |
| | Cutting number | 1 | 0 to 4, last cutting reported |
| | Cutting date | 8 | YYYYMMDD, last cutting date reported, or 00000000 if cutting number = 0 |
| | Irrigated | 1 | Y if irrigated, otherwise N |

(3) Crop Prediction

| | Field | Size | Value |
|---|---|---|---|
| To server: | Message ID | 2 | 03 (Crop Prediction) |
| | Call number | 5 | 5 digits entered by caller |
| | Growing field number | 2 | 01 to 99 |
| | Crop type | 1 | A for alfalfa |
| | | | S for corn silage |
| | | | G for grain |
| | Cutting number | 1 | 1 to 4 entered by caller |
| | Las cutting date | 8 | YYYYMMDD, from field lookup |
| | Plant Height | 2 | 01 to 60 inches |
| | Irrigation | 2 | 00 to 99 inches |
| | Soil Moisture | 1 | 1 to 5 entered by caller |
| | Plant Disease | 1 | 1 to 5 entered by caller |
| | Insect Pressure | 1 | 1 to 5 entered by caller |
| From server: | Message ID | 2 | 03 (Crop Prediction) |
| | Caller number | 5 | 5 digits entered by caller |
| | Response | 1 | S - success |
| | | | F - failure |
| | Growing field number | 2 | 01 to 99 |
| | NDF value | 3 | percentage with one decimal place, 001 to 999 |
| | NDF range | 3 | units with one decimal place, 001 to 999 |
| | NDF Confidence value | 3 | percentage with one decimal place, 001 to 999 |
| | 2 | 3 | same as NDF value above |
| | range 2 | 3 | same as NDF range above |
| | confidence 2 | 3 | same as NDF confidence above |

-continued (1) Caller Identification Message

| Field | Size | Value |
|---|---|---|
| value 3 | 3 | same as NDF value above |
| range 3 | 3 | same as NDF range above |
| confidence 3 | 3 | same as NDF confidence above |
| value 4 | 3 | same as NDF value above |
| range 4 | 3 | same as NDF range above |

(4) Cutting Report Message

| | Field | Size | Value |
|---|---|---|---|
| To server: | Message ID | 2 | 04 (Cutting report) |
| | Caller number | 5 | 5 digits entered by caller |
| | Growing field number | 2 | 01 to 99 |
| | Cutting number | 1 | 1 to 4 entered by caller |
| | Last cutting date | 4 | YYYYMMDD, or all zeros to delete cutting report |
| From server: | Message ID | 2 | 04 (Cutting report) |
| | Caller number | 5 | 5 digits entered by caller |
| | Response | 1 | S - success<br>F - failure |

As an alternative to the VIS 80, other types of user interfaces may be used. For example, the HMS 10 could be accessible by producers 20 with a computer, either through a direct modem link or via the Internet.

The Crop Characteristic Prediction Equation

An NDF content prediction formula was formulated from data on first-cut alfalfa cuttings during the 1993 and 1994 growing seasons. The data were collected from farmer-managed alfalfa fields in six states—Iowa, Minnesota, Pennsylvania, Michigan, Nebraska and Wisconsin.

Varieties of alfalfa that were studied were "Crown 2" and "Trident 2," though no significant differences were found in NDF content measures between the two. Plots within alfalfa fields free from grasses and weeds were reserved for sampling throughout May and June. At each site beginning in early to mid-May and once a week for five weeks, samples of approximately 100 stems were clipped three inches above the soil from five sites within the plot, air dried over nylon mesh, and then over-night mailed to a laboratory for analysis. A total of 260 samples were clipped and analyzed from 56 plots (27 in 1993 and 29 in 1994). Temperature data were obtained from the National Weather Service. A weighted average of maximum and minimum temperatures were calculated from data obtained from four or five weather stations closest to each plots.

For each cutting sample the following data hypothesized as being predictive of NDF content were collected: (1) latitude of the field; (2) average length of the plants; (3) age of the crop in days and measured from an arbitrarily selected date of May 1; (4) growing degree days (GDDs) accumulated from May 1 and based on a 41° F. base temperature; and (5) $GDD^2$. A lab-tested NDF value was also obtained for each sample. Using step-wise regression analysis including all five variables, the prediction formula found to have the best fit is as follows:

TABLE 1

| NDF = | | | |
|---|---|---|---|
| 44.187 | | | |
| minus | 0.712795 | X | latitude |

TABLE 1-continued

| NDF = | | | |
|---|---|---|---|
| plus | 0.2137549 | X | days since May 1 |
| plus | 0.29596869 | X | plant height in inches |
| plus | 0.0249508 | X | GDD |
| minus | 0.00001 | X | $GDD^2$ |

The $r^2$ value for this equation was found to be 0.890 and the root-mean-square-error (RMSE) was found to be 2.41. (Definitions for $R^2$ and RMSE can be found in the background section above.)

Significantly, a non-linear relationship was observed between NDF and GDD for this data set. It was found that the rate at which NDF content increases as a percentage of GDD is not constant over the growing period. In particular, it was found that the rate decreases over the growing period. This finding was made possible by virtue of the data set collected which included samples taken over an extended period of five weeks.

In addition, during periods of dry soil moisture, GDDs were found to accumulate with little change in the NDF measure. As such, a measure of soil moisture in a prediction equation is believed to overcome inadequacies of the GDD variable. In the equation above, the variable of average plant height is believed to be at least in part reflective of field soil moisture over the growing period of the alfalfa crop.

With the accessibility of a wide variety of weather data for research purposes offered by the invention as well as the ability of a harvest management system 10 in accordance with the invention to process raw weather data to produce non-standard weather variables, a suitable soil moisture profile over the growing period may be developed and will be readily usable by the producer 20. A suitable profile would involve modelling the balance of water loss via evapotranspiration and water gain via precipitation, and it would involve only accumulating GDDs when the soil moisture is above a certain threshold level.

An example of an NDF prediction using the prediction equation of Table 1 for an alfalfa crop that was cut in Wisconsin (latitude 44.6315°), 31 inches high at 591.13 GDD, was as follows:

TABLE 2

| Intercept | | | | 44.19 |
|---|---|---|---|---|
| − Latitude | −0.712795 | X | 44.6315 | −31.81 |
| + Age | 0.2137549 | X | 29 | 6.20 |
| + Height | 0.29596869 | X | 31 | 9.18 |
| + GDD | 0.0249508 | X | 591.13 | 14.75 |
| − $GDD^2$ | −0.00001 | X | 349434.677 | −3.49 |
| | | | Predicted NDF: | 39.00 |

The actual measured NDF for this crop was found to be 40.59.

The sensitivity of the NDF value to the various variables used in the equation can be seen from the following table:

TABLE 3

| 1° latitude | = | 0.713 | units NDF |
|---|---|---|---|
| 1 day in age | = | 0.214 | units NDF |
| 1" in height | = | 0.296 | units NDF |
| 1 GDD (from | = | 0.013 | units NDF |

TABLE 3-continued

GDD = 600 to
GDD = 601)

For comparison purposes, regression analysis was performed with only four of the five variables. Five different regression analyses were performed, each time with different variables omitted. Table 4 shows the $R^2$ and RMSE values when all of the variables are used, and when each of the five are omitted. An "X" in a column for a variable indicates that the variable was used in the regression analysis.

TABLE 4

| Lat | Length | Days | GDD | GDD$^2$ | $R^2$ | RMSE |
|-----|--------|------|-----|---------|-------|------|
| X   | X      | X    | X   | X       | .890  | 2.41 |
| X   |        | X    | X   | X       | .851  | 2.79 |
| X   | X      | X    |     |         | .876  | 2.56 |
| X   | X      |      | X   | X       | .870  | 2.62 |
|     | X      | X    | X   | X       | .875  | 2.56 |
| X   | X      | X    | X   |         | .881  | 2.51 |

Thus it was found that all of the five variables add a degree of accuracy to the prediction.

During the 1996 growing season, the NDF equation of Table 1 was tested using the HMS 10 of FIG. 1. Producers 20 participating in the test came from six states, Iowa, Minnesota, New York, Pennsylvania, South Dakota and Wisconsin. The equation was tested not only the first cuttings, but also for second and third cuttings. In the subsequent cuttings, GDDs and age were accumulated from the date of the previous cutting, instead of from May 1. The number of samples collected were as follows: first cuttings (123 samples), second cuttings (31 samples) and third cuttings (15 samples).

For the 1996 data set, the NDF formula of Table 1 was also compared to the PEAQ formula for NDF discussed above in the background section. The PEAQ formula for NDF is as follows:

$$NDF = 16.89 + 0.27 \, (HEIGHT) + 0.81 \, (STAGE)$$

The NDF predictions based on the equation of Table 1 were found to be more accurate than predictions based on PEAQ equations for all three cuttings. The following tables illustrate the increase in predictive accuracy:

TABLE 5

Average variation from lab NDF results for HMS and PEAQ predictions for all three alfalfa cuttings, 1996.

| Cutting | Sample Size | HMS Forecast | PEAQ Forecast | Diff. HMS vs. PEAQ |
|---------|-------------|--------------|---------------|---------------------|
| 1       | 123         | 3.86         | 5.07          | 1.21                |
| 2       | 32          | 3.67         | 5.44          | 1.77                |
| 3       | 15          | 3.64         | 6.36          | 2.72                |

The numbers in the last three columns of Table 5 are the absolute value of the NDF prediction minus the lab NDF measurement. Though the variation for the HMS predictions for the second and third cuttings (3.67 and 3.64 respectively) are relatively small, it is believed that they could be improved by developing equations that are specific to the particular cutting. Again, the equation of Table 1 was derived from first-cutting data only, and the equation is based on an arbitrarily established growing-period start date of May 1 instead of the growing-period start date of the previous cut date used in the subsequent cuttings.

TABLE 6

Percentages of HMS and PEAQ predictions within ± 3.0 NDF units for all alfalfa cuttings, 1996.

| Cutting | Sample Size | HMS Forecast | PEAQ Forecast | Accuracy ratio |
|---------|-------------|--------------|---------------|----------------|
| 1       | 123         | 50%          | 28%           | 1.8 × 1        |
| 2       | 31          | 42%          | 32%           | 1.3 × 1        |
| 3       | 15          | 67%          | 27%           | 2.5 × 1        |

TABLE 7

Percentages of HMS and PEAQ predictions that were more than ±6.0 NDF units in error for all alfalfa cuttings, 1996.

| Cutting | Sample Size | HMS Forecast | PEAQ Forecast | Accuracy Ratio |
|---------|-------------|--------------|---------------|----------------|
| 1       | 123         | 12%          | 44%           | 3.7 × 1        |
| 2       | 31          | 19%          | 35%           | 1.8 × 1        |
| 3       | 15          | 27%          | 40%           | 1.5 × 1        |

TABLE 8

Percentages of HMS and PEAQ predictions within ±3.0 NDF units for first alfalfa cutting, 1996, by state.

| State        | Sample Size | HMS Forecast | PEAQ Forecast |
|--------------|-------------|--------------|---------------|
| Iowa         | 12          | 33%          | 25%           |
| Minnesota    | 29          | 55%          | 62%           |
| New York     | 9           | 33%          | 33%           |
| Pennsylvania | 12          | 42%          | 17%           |
| South Dakota | 8           | 75%          | 75%           |
| Wisconsin    | 37          | 51%          | 19%           |

From Table 8 it can be seen that regional biases still appear to exist, though improved from the PEAQ equations. It is believed that with further refinement of the weather variables and the prediction equations, the regional biases will become minimal.

TABLE 9

Percentages of HMS and PEAQ predictions within ±3.0 NDF units for second alfalfa cutting, 1996, by state

| State        | Sample Size | HMS Forecast | PEAQ Forecast |
|--------------|-------------|--------------|---------------|
| Minnesota    | 7           | 43%          | 29%           |
| Pennsylvania | 8           | 29%          | 43%           |
| Wisconsin    | 8           | 71%          | 29%           |

These comparisons of the crop characteristic prediction equation of Table 1 versus the PEAQ method illustrate the value of using weather information in the crop characteristic prediction equation. With the HMS 10 in accordance with the invention, that information is easily estimated from readily accessible weather data.

Other embodiments are within the scope of the following claims. For example, instead of the producer computer 90 (FIG. 1) performing the crop characteristic prediction processing, this processing could be performed a local computer of the producer 20. In this case, the crop and field information (including perhaps field-specific weather information) for entry into a prediction equation residing on the local computer would be retrieved by the producer 20 from the HMS 10 via the VIS 80. The local computer could be a hand-held calculator, personal computer or similar device.

What is claimed is:

1. A system for providing producers with crop characteristic predictions for standing crops located in fields, comprising:
    a central database for storing field and crop information for said crops located in fields;
    a user interface for selecting a field for which field and crop information is stored in said central database; and
    a computer for calculating, for said selected field, a crop characteristic prediction, wherein said prediction is based on said stored field and crop information for said selected field and a crop characteristic prediction equation.

2. The system of claim 1 further comprising a weather data processor associated with said central database, said processor adapted for processing raw weather data to produce field weather information for entry into said crop characteristic prediction equation, said field weather information comprising at least a portion of said crop and field information stored in said central database.

3. The system of claim 2 further comprising an interface to a weather data service, said interface adapted for downloading, from a weather data service, said raw weather data, wherein said raw weather data is from a plurality of weather stations.

4. The system of claim 2 further comprising a user interface for said producers to enter said raw weather data from at least one site-specific weather station associated with one of said fields.

5. The system of claim 2 wherein said field weather information includes the square of a growing degree day measure.

6. The system of claim 2 wherein said field weather information includes a soil moisture profile over a growing period for said crops.

7. The system of claim 1 wherein said crops comprise forage crops.

8. The system of claim 7 wherein said forage crops comprise alfalfa crops.

9. The system of claim 8 wherein said crop characteristic comprises at least neutral detergent fiber content.

10. The system of claim 7 wherein said forage crops comprise crops having a mixture of alfalfa and grasses.

11. The system of claim 7 wherein said forage crops comprise corn silage crops and said crop characteristic comprises at least plant moisture content.

12. The system of claim 1 wherein said computer for calculating said prediction comprises at least a portion of a central computer system also comprising said central database.

13. The system of claim 12 wherein said user interface comprises a voice information system.

14. The system of claim 12 wherein said central computer system provides producers with a crop characteristic prediction via said user interface.

15. The system of claim 14 wherein said user interface is adapted to allow producers to enter data into said central computer system, at least a portion of said field and crop information being derived from said entered data.

16. The system of claim 1 wherein said computer for calculating said prediction comprises at least one local computer associated with one of said producers.

17. The system of claim 16 wherein said local computer is a hand-held calculator.

18. The system of claim 16 wherein said local computer is a personal computer.

19. The system of claim 16 wherein said user interface is adapted to allow producers to obtain field and crop information from said central database to be used by said local computer to calculate said crop characteristic prediction.

20. The system of claim 1 wherein said crop characteristic prediction equation is developed based on said crop and field information stored in said central database.

21. A method for producing a crop in a field, comprising:
    retrieving, from a central database, crop and field information for said field, said retrieved information for entry into a crop characteristic prediction equation;
    computing a crop characteristic prediction based on said retrieved information and said crop characteristic prediction equation; and
    harvesting said crop at a time determined from said crop characteristic prediction.

22. The method of claim 21 wherein said crop and field information includes at least weather information for said field.

23. The method of claim 21 wherein said crop characteristic prediction is calculated using a computer that comprises at least a portion of a central computer system also comprising said central database.

24. The method of claim 21 wherein said crop characteristic prediction is calculated using a local computer.

25. The method of claim 22 wherein said field weather information is derived from weather data downloaded from a weather data service having weather data from a plurality of weather stations.

26. The method of claim 22 further comprising:
    collecting weather data from a site-specific weather station associated with said field; and
    providing said site-specific weather data to a central computer system associated with said central database, wherein said site-specific weather information is processed by said central computer system to obtain said field weather information.

27. A method for providing to a requestor a prediction of a crop characteristic of a standing forage crop in a selected field, comprising:
    obtaining crop and field information for entry into a crop characteristic prediction equation and storing said crop and field information in a central database;
    processing said crop and field information for said selected field to obtain said crop characteristic prediction for said selected field; and
    forwarding said crop characteristic prediction to said requestor.

28. The method of claim 27 wherein said crop and field information includes at least weather information for said field.

29. The method of claim 27 wherein said processing is performed by a computer associated with a central computer system also comprising said central database.

30. The method of claim 27 wherein said processing is performed by a local processor associated with said requestor after said crop and field information for said selected field is obtained from said central database.

31. The method of claim 28 wherein said field weather information is derived from weather data downloaded from a weather data service, wherein downloaded weather data are from a plurality of weather stations.

32. The method of claim 28 further comprising:
    collecting weather data from a site-specific weather station associated with said selected field; and providing said weather data from said site-specific weather station to a central computer system associated with said central database, wherein said weather data are processed by said central computer system to obtain said field weather information.

33. A method of producing a product, comprising:

harvesting a crop in a field at a time determined from a crop characteristic prediction, said crop characteristic prediction being based on (i) a crop characteristic prediction equation and (ii) crop and field information obtained from a central database; and processing said harvested crop to produce said product.

34. The method of claim 33 wherein said crop is a forage crop and said product is a forage-based feed for animals.

35. The method of claim 34 wherein said forage crop is alfalfa and said crop characteristic includes at least neutral detergent fiber content.

36. The method of claim 33 wherein said forage crop is corn silage and said crop characteristic includes at least plant moisture content.

37. The method of claim 33 wherein said crop is a grain and said product is a food ingredient for an end product for human consumption.

38. The method of claim 33 wherein said crop is a grain and said product is an animal feed.

39. The method of claim 33 wherein said crop is soy beans and said product is an oil.

40. The method of claim 33 wherein said crop is soy beans and said product is soy bean meal.

41. The method of claim 33 wherein said crop is corn and said product is a corn oil.

42. The method of claim 33 wherein said crop is corn and said product is a high-fructose corn syrup.

43. The method of claim 33 wherein said crop is corn and said product is corn meal.

44. A method for providing to a requester a prediction of a crop characteristic of a standing forage crop in a selected field, comprising:

determining the growing degree days for said selected field;

determining a value for a parameter reflective of at least growing period soil moisture for said selected field;

processing said growing degree value and said parameter value to obtain a prediction of said crop characteristic for said selected field; and forwarding said crop characteristic prediction to said requester.

45. The method of claim 44 wherein said standing forage crop is alfalfa.

46. The method of claim 45 wherein said parameter reflective of at least growing period soil moisture is plant height, and wherein said parameter value is determined by said requester and thereafter provided for said processing.

47. The method of claim 44 wherein said parameter reflective of at least growing period soil moisture comprises a climatological parameter and said parameter value is obtained independent of said requestor.

48. The method of claim 44 wherein said climatological parameter is a soil moisture profile over said growing period.

49. A system for providing producers with crop characteristic predictions for standing forage crops located in fields, comprising:

a database for storing field and crop information for said crops, said field and crop information comprising at least growing degree day information for said fields and a value for a parameter reflective of at least growing period soil moisture for said fields;

a computer for calculating, for a selected field in said database, a crop characteristic prediction, wherein said prediction is based on said growing degree day information and said value for said parameter reflective of at least growing period soil moisture for said fields; and a user interface for forwarding said crop characteristic prediction to said producer.

50. The system of claim 49 wherein said standing forage crop is alfalfa.

51. The method of claim 49 wherein said parameter reflective of at least growing period soil moisture is plant height, and wherein said parameter value is determined by said producer and thereafter provided for said processing.

52. The method of claim 49 wherein said parameter reflective of at least growing period soil moisture comprises a climatological parameter and said parameter value is obtained independent of said requestor.

53. The method of claim 52 wherein said climatological parameter is a soil moisture profile over said growing period.

* * * * *